Jan. 19, 1954     F. M. POOLE ET AL     2,666,326
VOLUMETRIC MEASURING APPARATUS
Filed Dec. 22, 1947     11 Sheets-Sheet 2

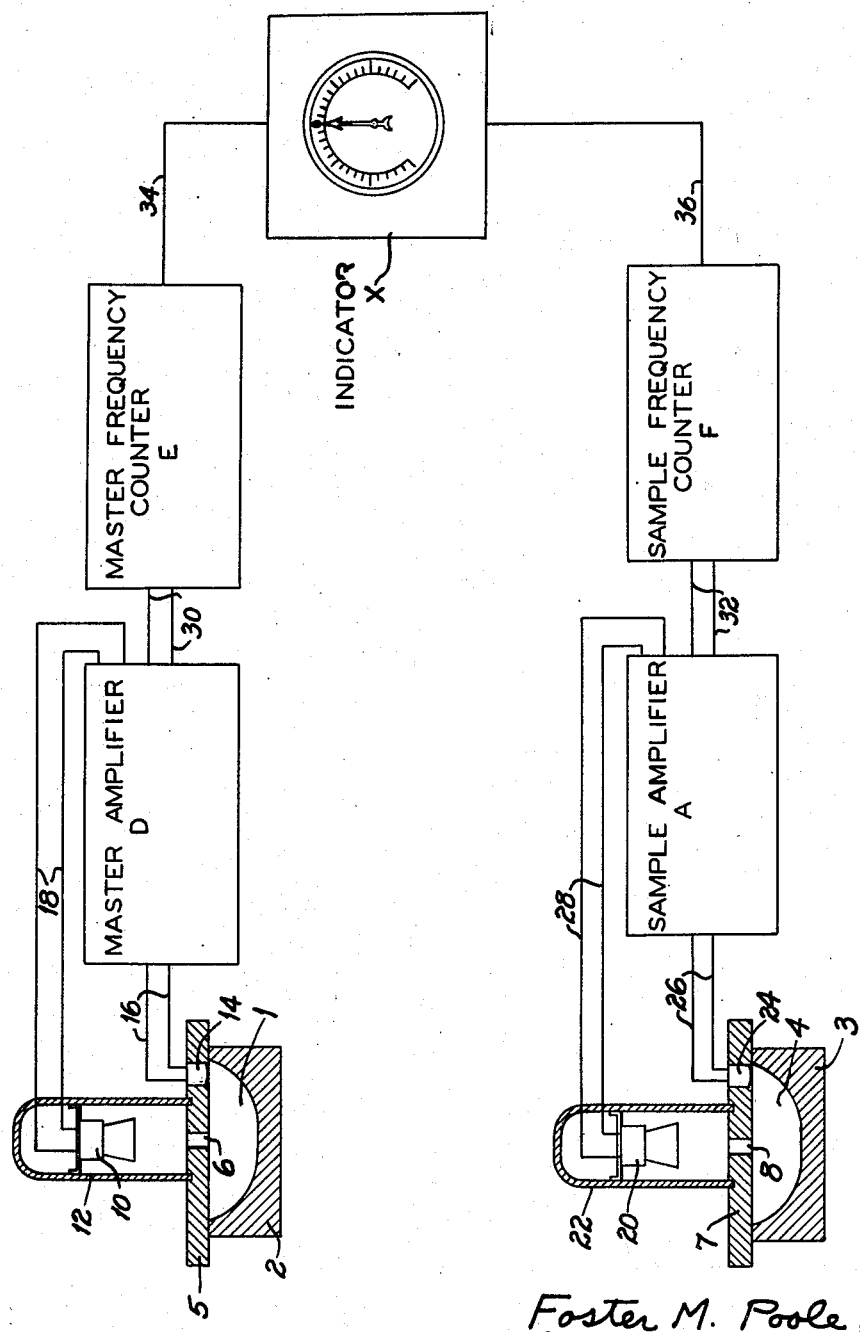

Foster M. Poole,
Leroy C. Paslay,
Inventors;
Haynes and Koenig
Attorneys.

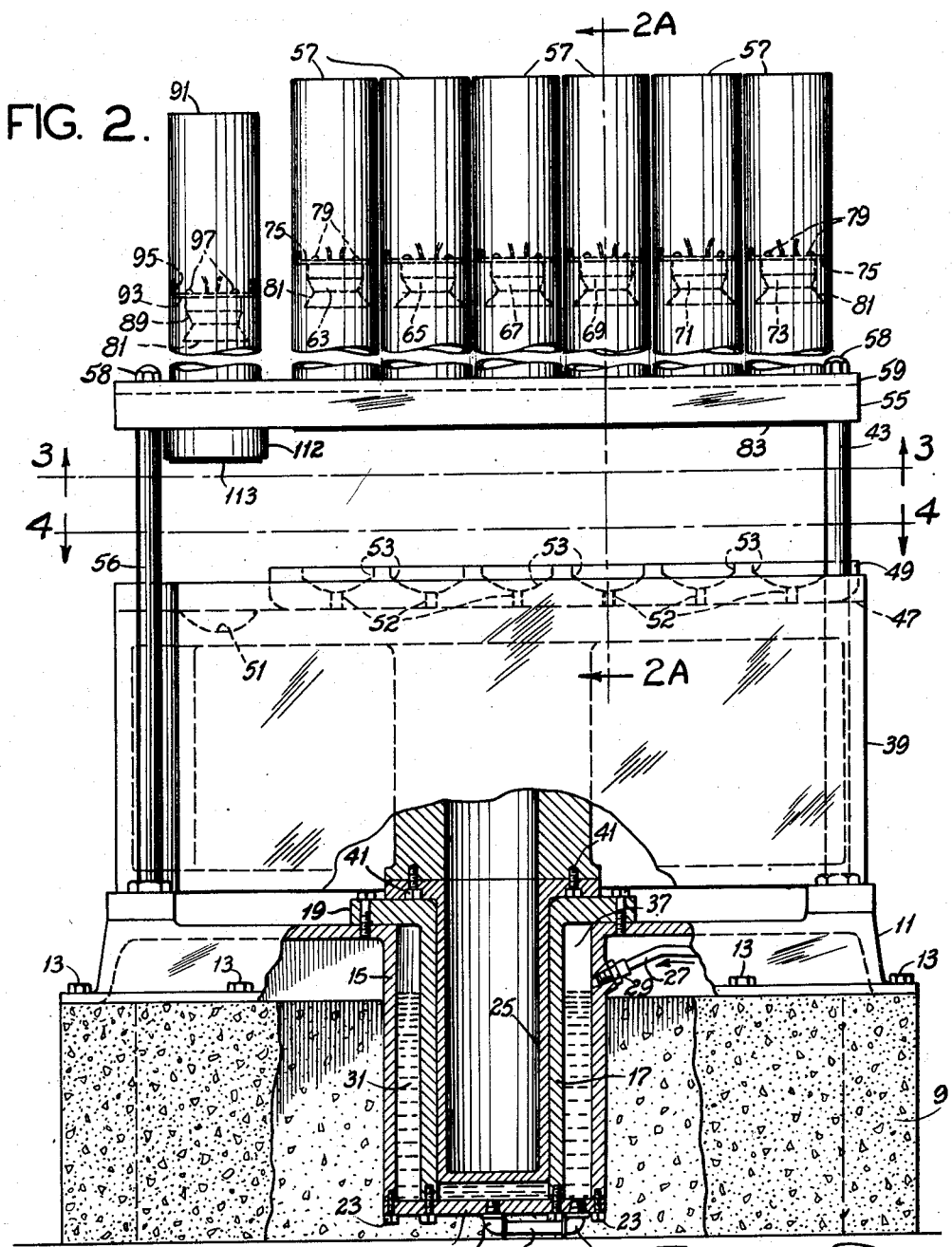

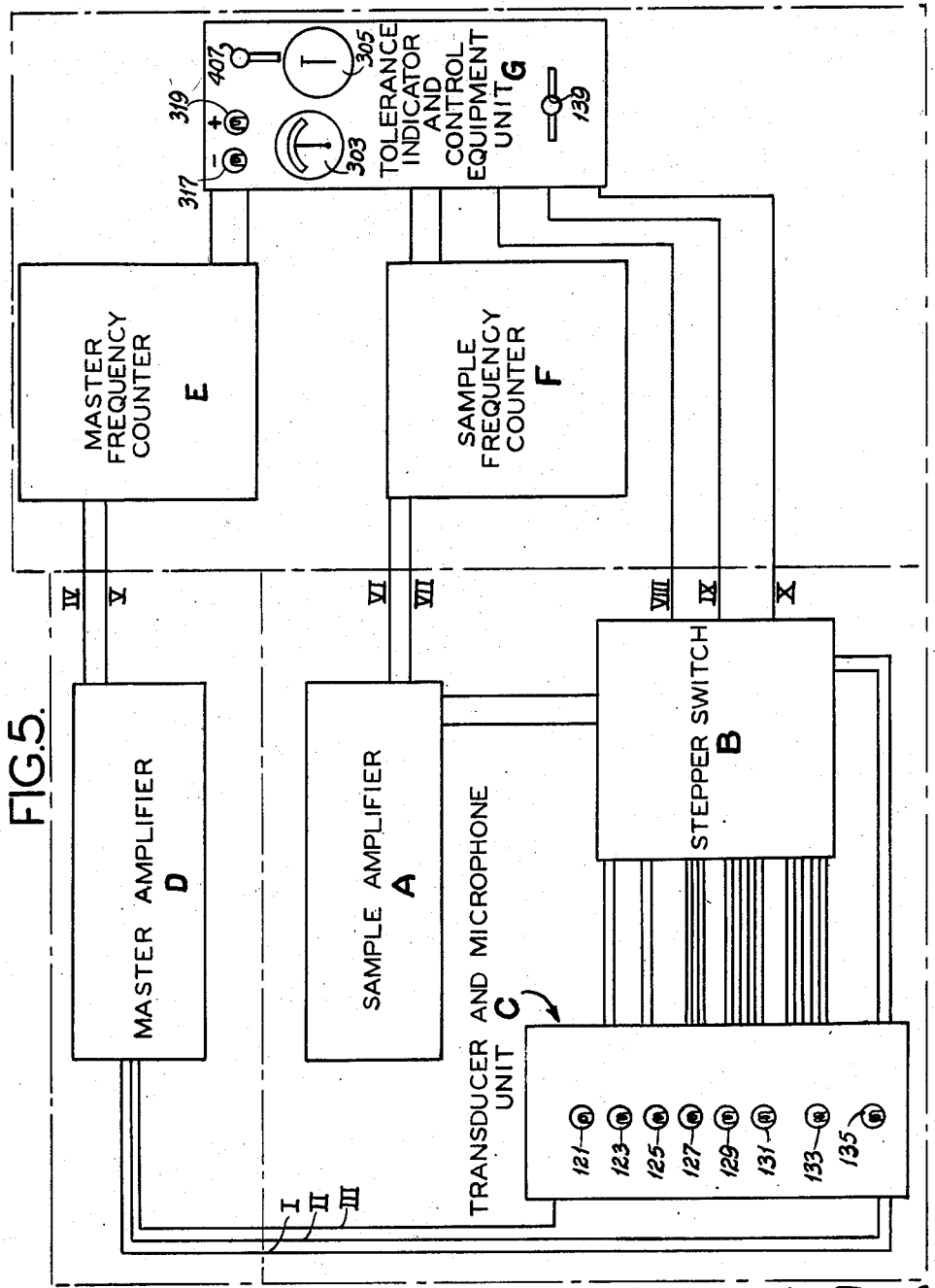

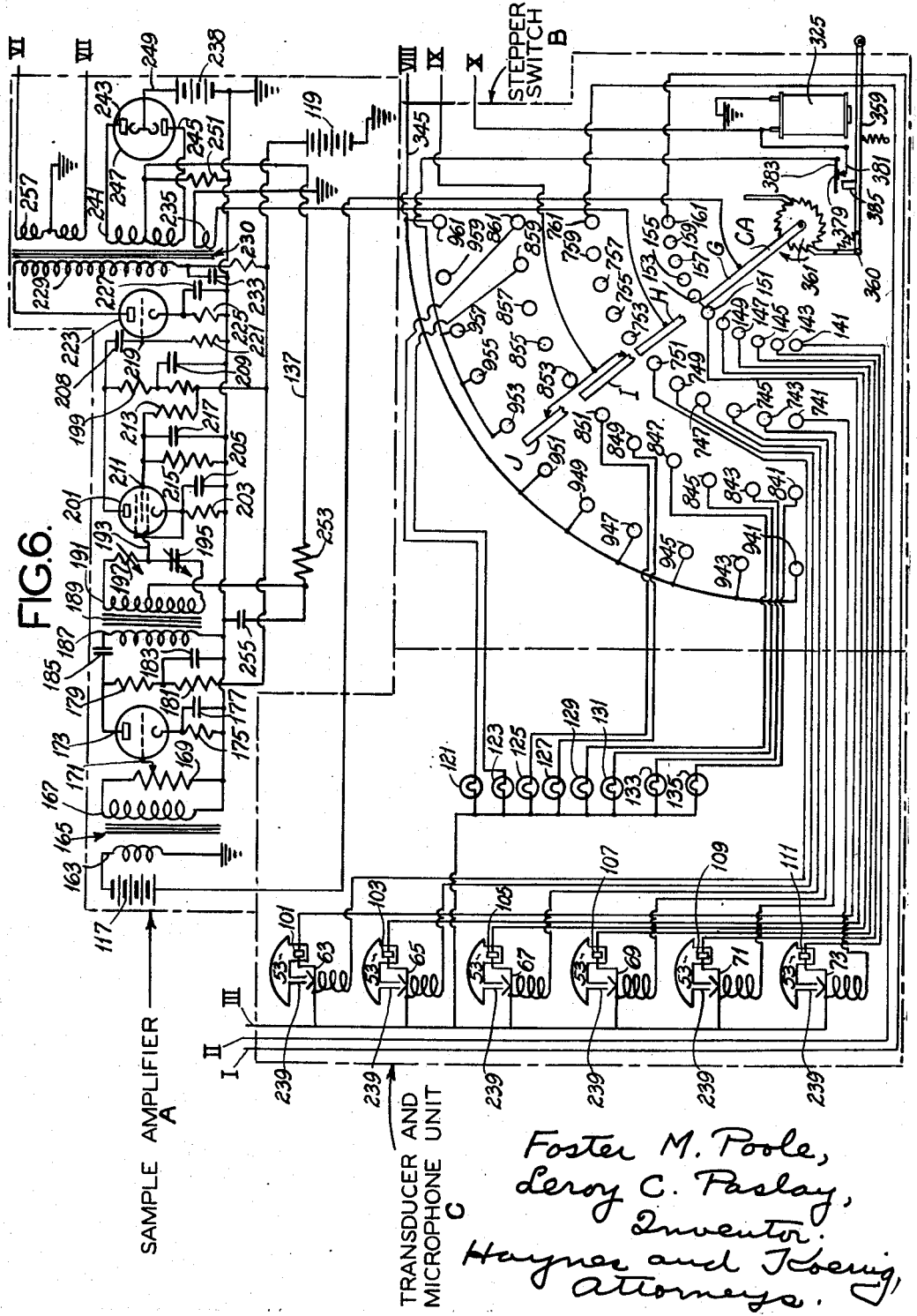

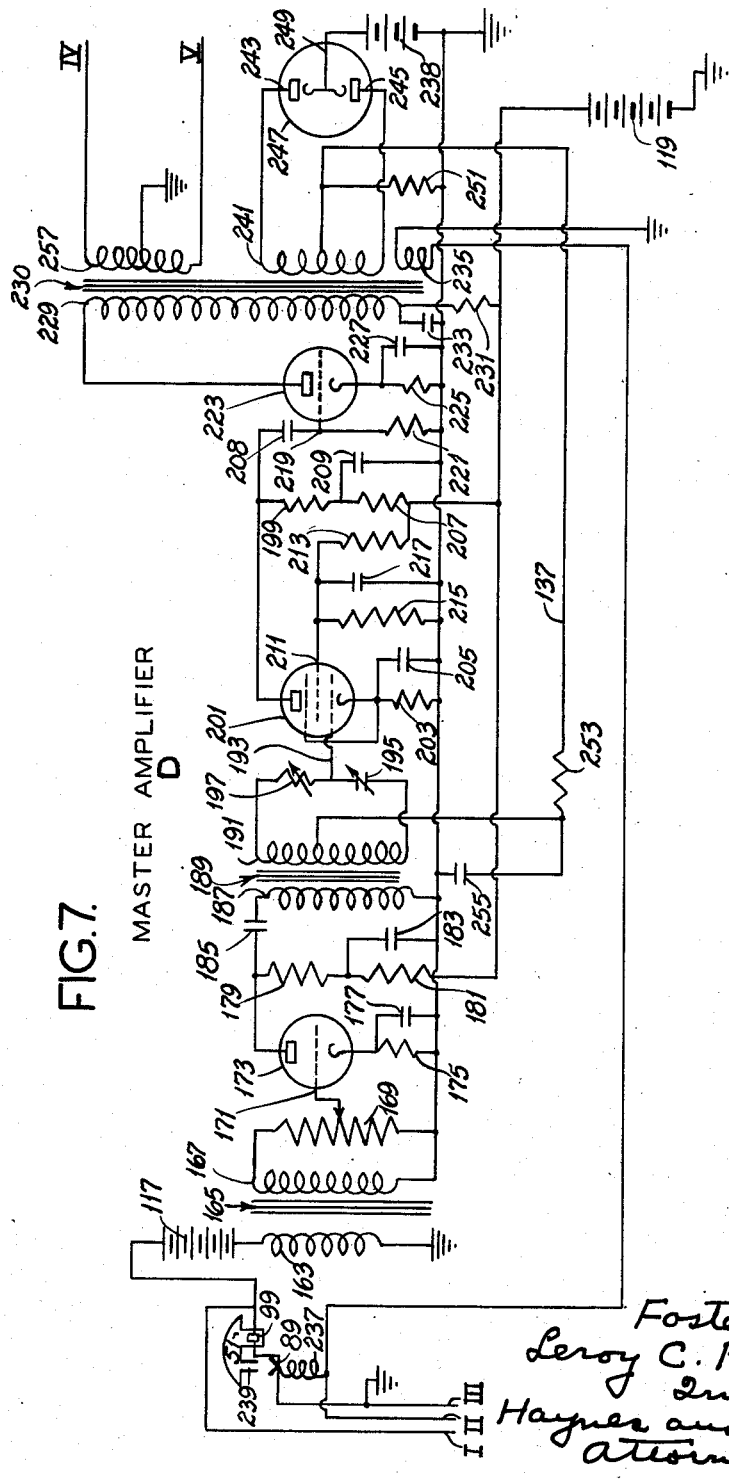

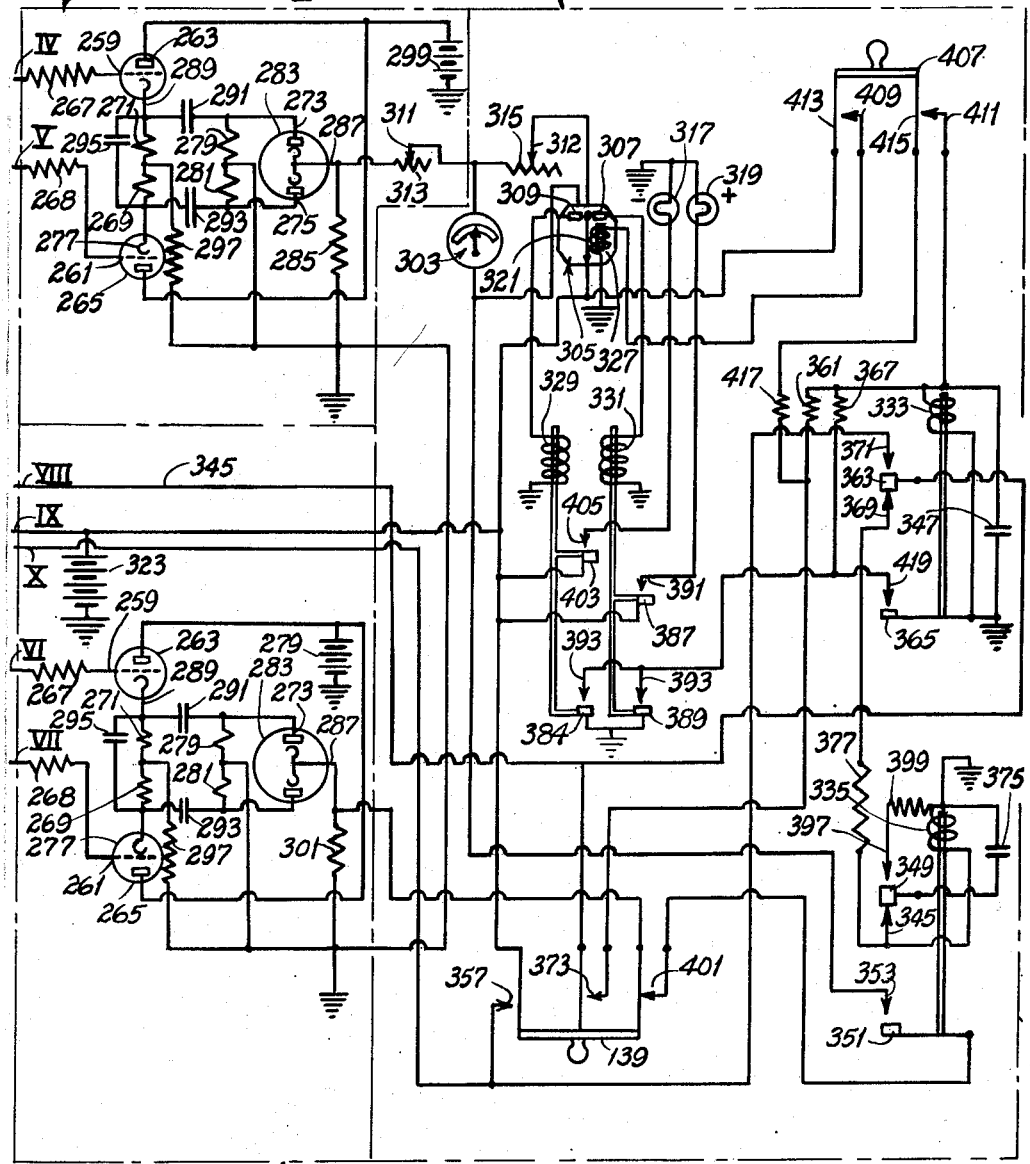

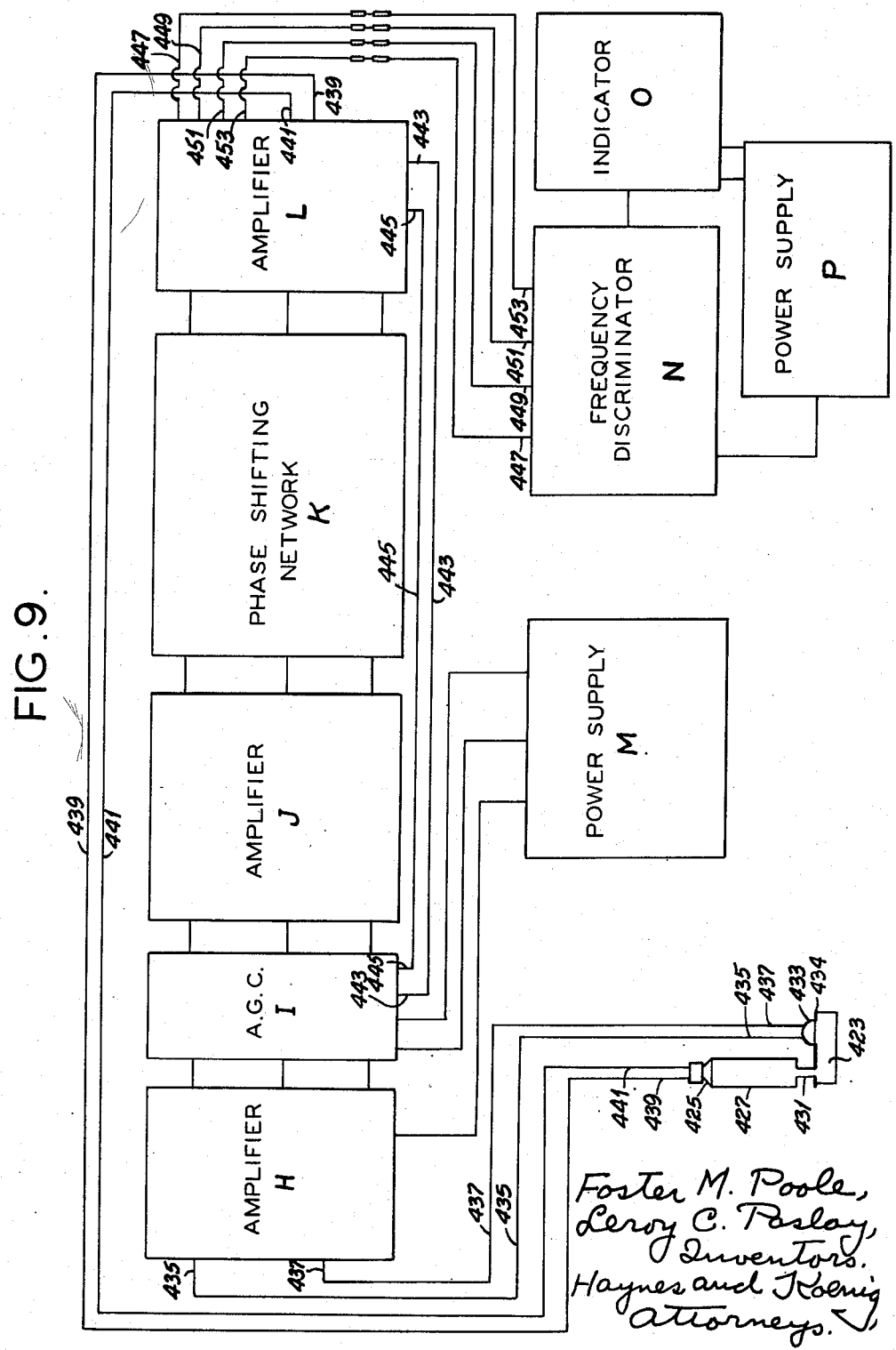

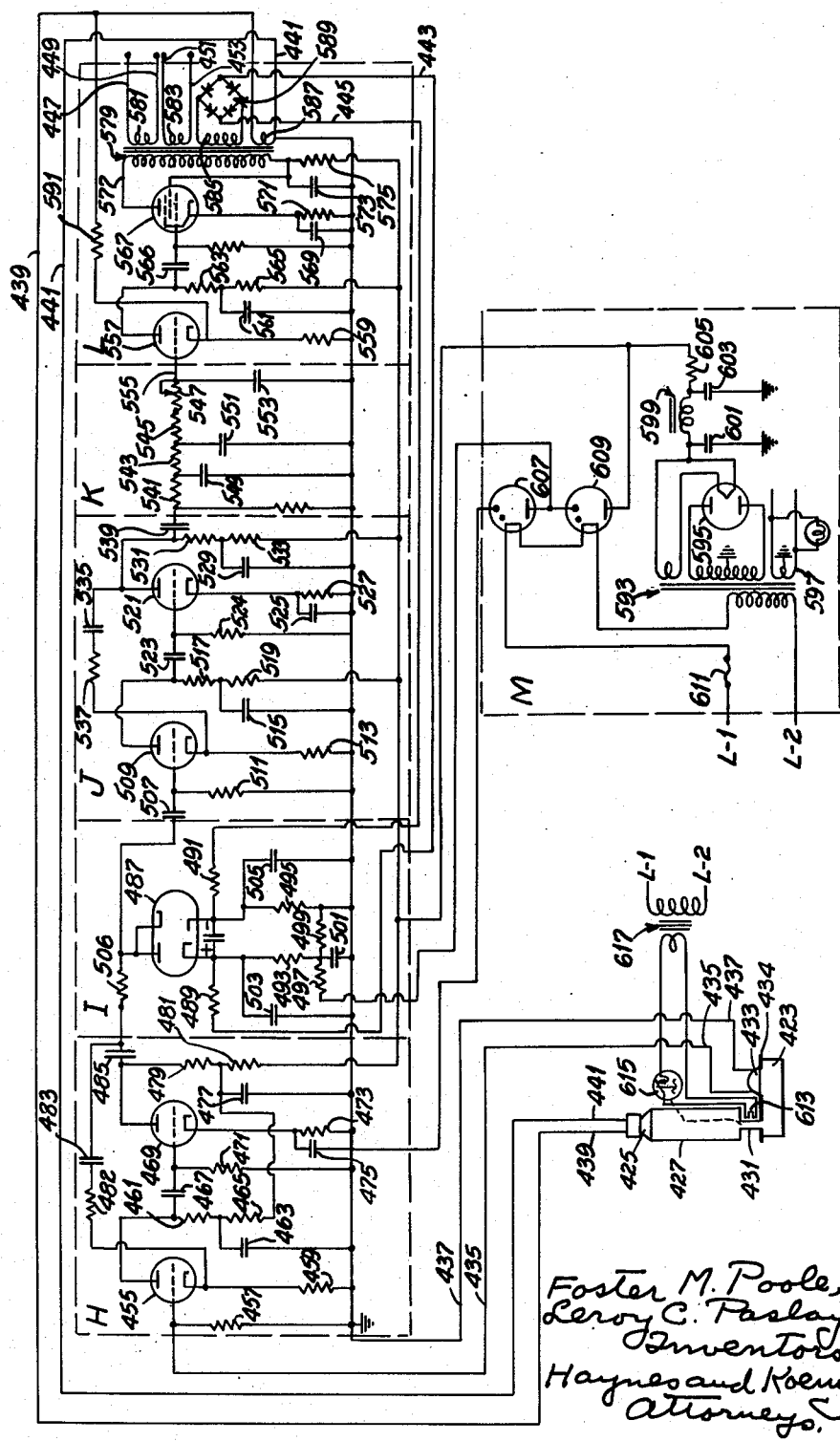

Jan. 19, 1954    F. M. POOLE ET AL    2,666,326
VOLUMETRIC MEASURING APPARATUS

Filed Dec. 22, 1947    11 Sheets-Sheet 10

Foster M. Poole,
Leroy C. Paslay,
   Inventors.
Haynes and Koenig,
   Attorneys.

Jan. 19, 1954   F. M. POOLE ET AL   2,666,326
VOLUMETRIC MEASURING APPARATUS
Filed Dec. 22, 1947   11 Sheets-Sheet 11

Foster M. Poole,
Leroy C. Paslay,
Inventors.
Haynes and Koenig
Attorneys.

Patented Jan. 19, 1954

2,666,326

UNITED STATES PATENT OFFICE 2,666,326

VOLUMETRIC MEASURING APPARATUS

Foster M. Poole and Le Roy C. Paslay, University Park, Tex., assignors, by direct and mesne assignments, of one-half to said Poole, and one-half to Carl Casey, Dallas, Tex.

Application December 22, 1947, Serial No. 793,304

34 Claims. (Cl. 73—149)

This invention relates to volumetric measuring apparatus, more particularly to apparatus for measuring the volumes of cavities of any shapes.

Among the several objects of the invention may be noted the provision of apparatus for accurately measuring the volumes of cavities of any configuration; the provision of apparatus of the class described for rapidly effecting a comparison of a known volume and the unknown volume of a cavity to be measured; the provision of apparatus of this class which affords accurate volume measurements despite variations in ambient temperature and humidity; and the provision of apparatus such as described which is reliable in operation and easily calibrated. Other objects will be in part apparent and in part pointed out hereinafter.

The invention accordingly comprises the elements and combinations of elements, features of construction, and arrangements of parts which will be exemplified in the structures hereinafter described, and the scope of the application of which will be indicated in the following claims.

In the accompanying drawings, in which several of various possible embodiments of the invention is illustrated, Fig. 1 is a diagrammatic view illustrating certain fundamental features of an embodiment of the invention;

Fig. 2 is a front elevation of an apparatus embodying the invention for measuring the volumes of the cavities in the head block of an internal combustion engine, parts being broken away and shown in section;

Fig. 5 is a block diagram of the electronic components of the apparatus of Fig. 2;

Figure 11:
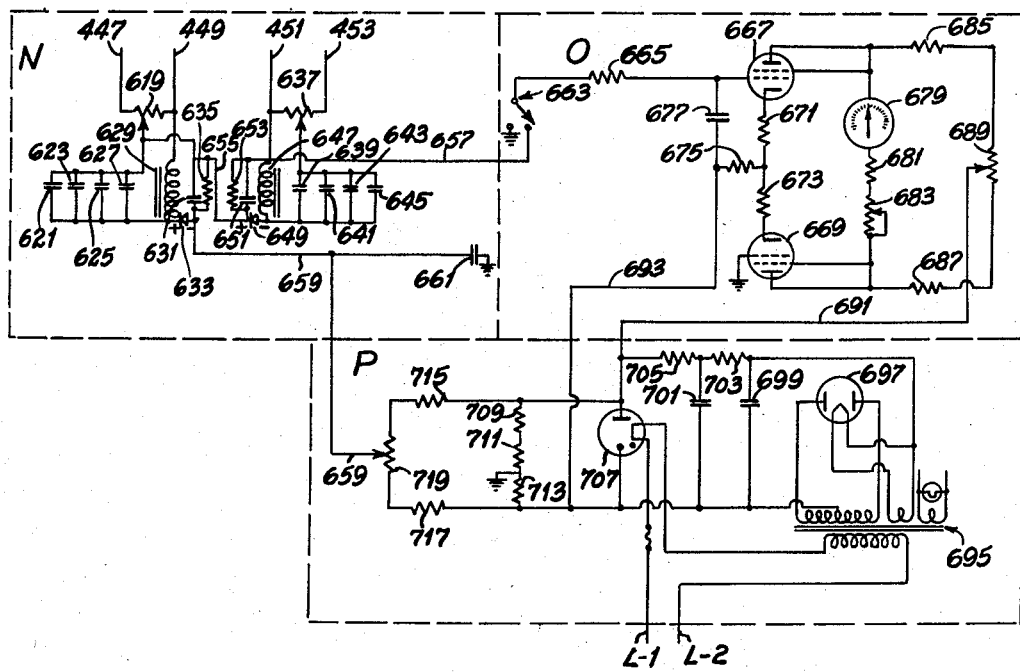
Figure 12:
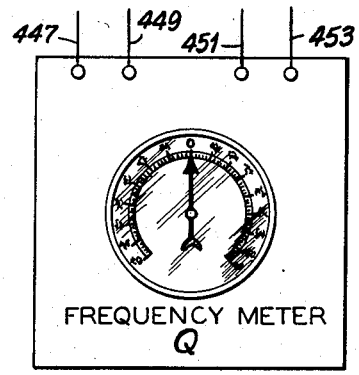
Figure 13:
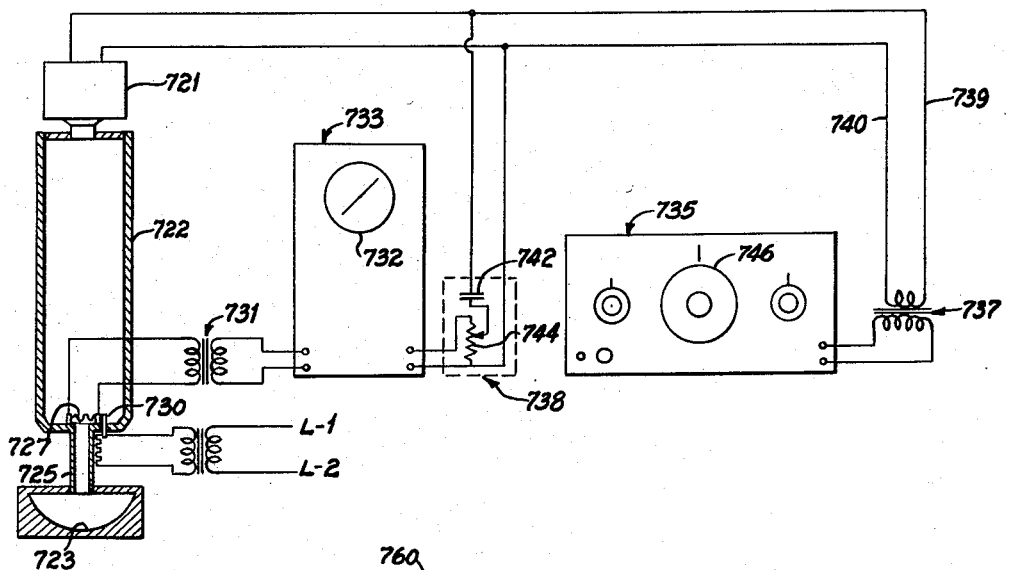
Figure 14:
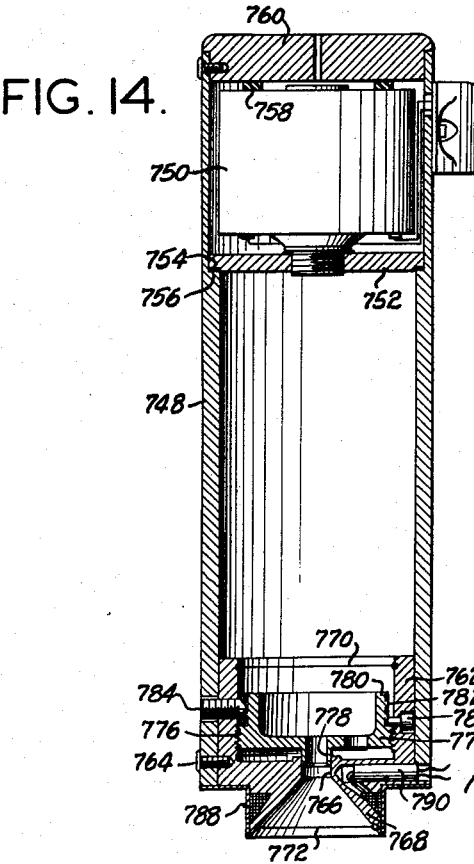

Figs. 6—8 combine to form a wiring diagram detailing the electronic circuits of the apparatus of Fig. 2, the electrical connections among these figures being denoted by wires to which Roman numerals are applied;

Fig. 9 is a block diagram of another embodiment of the invention;

Figs. 10 and 11 combine to form a wiring diagram detailing the electronic circuits of the apparatus of Fig. 9;

Fig. 12 is a view of a frequency meter which may be substituted for a part of the apparatus of Fig. 9;

Fig. 13 is a block diagram of a further embodiment of the invention; and,

Fig. 14 is a vertical section of a transducer unit such as may be employed in apparatus of this invention.

Similar reference characters indicate corresponding parts throughout the several views of the drawings.

This invention utilizes the principle that the natural sonic frequency of resonance of an acoustic resonator having a throat is dependent only upon the volume of the resonator and the length and cross-sectional area of the throat, being independent of the shape or configuration of the resonator. If a cavity (such as a cavity to be volumetrically measured) is provided with a throat having a small volume relative to the volume of the cavity, to form a resonator, the mass or slug of air in the throat may be utilized as a free piston and sonically oscillated to cause the air within the cavity to resonate at the natural resonant frequency of the cavity acting as a resonator, as determined by its volume and the dimensions of the throat. The volume of the cavity may therefore be determined as a function of the natural resonant frequency of the cavity acting as a resonator.

We utilize this principle to determine the volume of a cavity, hereinafter referred to as a "sample" cavity, by comparing its natural resonant frequency with the natural resonant frequency of a cavity of accurately predetermined volume, hereinafter referred to as a "standard" or "master" cavity. It will be understood that the difference in these frequencies is a measure of the volume of the sample cavity as compared with the volume of the master and, conversely, that the volume of the sample cavity is a function of the difference between these frequencies.

Fig. 1 generally illustrates the essentials of an apparatus for effecting a comparison of the natural resonant frequencies of a master cavity and a sample cavity, to make clear the fundamental features of this invention. A master cavity 1, of known volume, is provided in a body 2. A body 3 has a sample cavity 4 therein, the volume of which is to be determined by comparison with the volume of the master cavity. The master cavity 1 is closed off by a closure 5 having a throat 6 to form a resonator. Similarly, the sample cavity is closed off by a closure 7 having a throat 8 to form a resonator. By causing sonic vibration of the slug of air in each throat at the proper frequency, it is possible to cause the air within each cavity to resonate at its natural frequency of resonance.

An electroacoustic transducer or loudspeaker 10 is mounted on closure 5 within a housing 12 to cause vibration of the air in throat 6 and resonance of the air in the master cavity 1. A receiver or microphone 14 is carried by the closure 5 in acoustic communication with the master cavity. Acoustic communication may also be attained, for example, by separately mounting the microphone against the outside of the body containing the cavity. That is, the microphone need not be mounted on the closure member to be in acoustic communication with the cavity. The electrical output of microphone 14 is coupled by wires 16 to the input of an amplifier D, hereinafter designated as the "master" amplifier. One output of this amplifier is coupled to the transducer 10 as by wires 18 to form a closed oscillatory circuit.

Similarly, an electroacoustic transducer or loudspeaker 20 is mounted on closure 7 within a housing 22 to cause vibration of the air in throat 8 and resonance of the air in sample cavity 4. A microphone 24 is carried by closure 7 in acoustic communication with the master cavity. The electrical output of microphone 24 is coupled as by wires 26 to the input of an amplifier A, hereinafter referred to as the "sample" amplifier. One output of the sample amplifier is coupled to the transducer 20 as by wires 28 to form a closed oscillatory circuit.

A second output of the master amplifier D is coupled to the input of a frequency counter E, hereinafter referred to as the "master" frequency counter, by wires 30. Similarly, a second output of sample amplifier A is coupled to the input of a frequency counter F, hereinafter referred to as the "sample" frequency counter, by wires 32. The function of these frequency counters is to convert the A. C. signals received from the respective amplifiers to D. C. voltages, the potentials of which are functions of the frequencies of the respective A. C. signals. The D. C. outputs of the master and sample frequency counters are coupled by wires 34 and 36, respectively, to an indicator unit X, such as a galvanometer, in such manner that the indicator functions in response to and indicates the difference in the D. C. voltages put into it from the frequency counters. Thus indicator X measures the difference in volumes.

The operation of the apparatus generally is as follows:

Any casual ambient sound received by the microphones 14 and 24 is converted thereby into electrical signals. These signals are fed to the master and sample amplifiers, respectively.

The signal received by the master amplifier D is amplified and fed to the transducer 10 which converts it into vibrating acoustic energy. This energy is converted by microphone 14 to an electrical signal, which is received by the master amplifier D, amplified, and fed to the transducer 10. The oscillations in the closed oscillatory circuit quickly build up to the point where the air in the master cavity is caused to oscillate at its natural resonant frequency as determined by the volume of the cavity and the characteristics of the throat 6.

Similarly, the electrical signal received by the sample amplifier A is amplified and fed to the transducer 20 which converts it to acoustic energy. This energy is converted by microphone 24 to an electrical signal, which is received by the sample amplifier, amplified, and fed to the transducer 20. The oscillations in the closed oscillatory circuit quickly build up to the point where the air in the sample cavity is caused to oscillate at its natural resonant frequency as determined by the volume of the sample cavity and the characteristics of the throat 8.

The master and sample amplifiers D and A have components for maintaining the amplitude of the electrical signals therethrough substantially constant. Thus, the sonic oscillation of the air within each of the master and standard cavities is maintained at a substantially constant amplitude, and at a frequency which is a function of the volume of the respective cavity.

The output of the master amplifier, an A. C. signal having a frequency corresponding to the resonant frequency of oscillation of the air in the master cavity and thus corresponding to the volume of the cavity, is converted by the master frequency counter E to a D. C. voltage, the potential of which is a measure of the volume of the master cavity. The output of the sample amplifier, an A. C. signal having a frequency corresponding to the resonant frequency of the air in the sample cavity and thus corresopnding to the volume of the sample cavity, is converted by the sample frequency counter F to a D. C. voltage, the potential of which is a measure of the volume of the sample cavity. The difference between these two potentials is indicated by the meter X as an indication of the difference between the volume of the sample cavity and the volume of the master cavity. The meter may be calibrated in terms of volume to give direct volume readings.

The closed master and sample cavities may be located closely adjacent to one another so as to be equally affected by changes in ambient temperature and/or humidity. Thus, the apparatus is inherently self-compensating so far as ambient temperature and humidity effects are concerned.

Figs. 2–8 illustrate in detail an embodiment of the invention particularly for rapidly measuring or testing the volumes of the cavities in the head block of an internal combustion engine to determine whether the volumes are within required tolerance limits. This embodiment is shown in Fig. 2 to have a foundation 9 upon which a base member 11 is fixed by bolts 13. The base member is centrally formed with a depending cylindrical wall 15 open at its upper and lower ends. Within the wall 15 is a cylinder 17 having a flange 19 at its upper end fixed to the base member 11 by bolts. The lower ends of both cylindrical wall 15 and cylinder 17 are closed and sealed by a closure plate 21 fixed thereto by bolts 23. The flange 19 closes the upper end of wall 15 around cylinder 17. A piston 25 is slidable in the latter.

The space between wall 15 and cylinder 17 forms a reservoir. Compressed air may be supplied to the upper end of the reservoir through a pipe 27 and an inlet 29. The reservoir contains fluid 31 and is in communication with the lower end of cylinder 17 through a pipe 33 and fittings 35. The arrangement is such that when compressed air is admitted to the reservoir, the reservoir fluid is forced into the cylinder 17 to raise the piston 25 from its lowered position of Fig. 2. When pressure is released, the piston will descend.

A work-holding table 39 is fixed upon the upper end of piston 25 by bolts 41. The table is guided for vertical movement by guide posts 43 and 45 which extend vertically from base 11 through apertures in diagonally opposite corners of the table. The top of the table is recessed throughout its length, as indicated at 46, and is provided with spacers 47 so that a sample engine head block 49 may be accurately positioned thereon. A master or standard cavity 51, having a known predetermined volume, is formed in the table top adjacent its left end as viewed in Figs. 2, 3 and 4. The head block 49 is illustrated as having six cavities 53, the volumes of which are to be determined by comparison with the known volume of standard cavity 51. The table is of such length as to support the head block throughout its length with the left end of the head block adjacent the standard cavity.

If the head block 49 has been completed to the extent of having spark plug holes 52 (shown dotted) prior to testing in the apparatus of this invention, these holes may be suitably plugged flush with the inside of the cavities 53 (Fig. 2). If the holes have not yet been drilled, this plugging step is not necessary.

Figure 4:
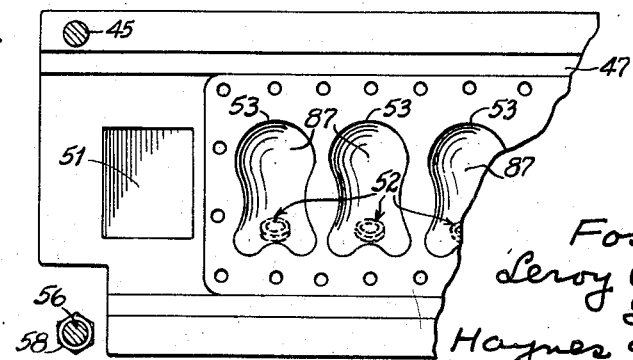
Fig. 4 is a fragmentary horizontal section taken on line 4—4 of Fig. 2.

A head plate 55 is fixedly secured upon the upper ends of posts 43 and 45, and additional posts 56, above the table 39 by means of nuts 58. Diagonally opposite corners of the table are notched out, as illustrated in Fig. 4, to clear the posts 56. The head plate 55 has a row of bushed throat openings 239 corresponding in number and spacing to the cavities 53 in the head block 49. These openings continue through a plate 59 fixed by screws 61 in a recess in the top of head plate 55. Each of throats 239 opens into a housing 57 mounted on the plate 59. Each housing contains an electroacoustic transducer or loudspeaker, designated 63, 65, 67, 69, 71 and 73 from left to right in Fig. 2. Each transducer is mounted within its housing upon a bracket 75. The bracket is fixed to the housing at 77 and the transducer is fixed to the bracket at 79 with its horn 81 directed toward the throat 239.

Figure 2A:
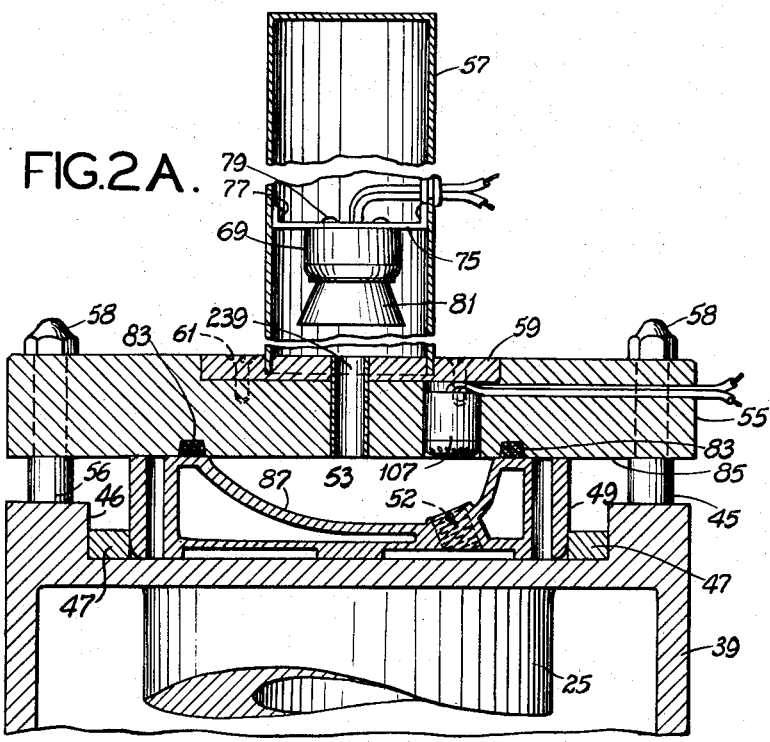
Fig. 2A is a fragmentary enlarged vertical section taken on line 2A—2A of Fig. 2.

The above-described arrangement is such that the engine head block 49 may be positioned on the table 39 in the lowered position of the latter, as illustrated in Fig. 2, with the cavities 53 in the block opening upward. Compressed air may then be admitted to the reservoir to raise the piston 25 and the table to raise the head block 49 into engagement with the bottom of head plate 55. This closes the cavities 53, as illustrated in Fig. 2A, except for the throat openings 239, which provide for acoustic communication between the cavities and the housings 57. Gaskets 83 may be recessed in the bottom of head plate 55 to insure a tight seal around the cavities, but are not absolutely necessary where the engaging surfaces are accurate.

Under some circumstances, it may be desirable to provide individual, resiliently mounted closure head plates for each cavity, so that each head plate may be self-adjusting to compensate for warp of the engine head block.

When the table is raised as aforesaid, the standard cavity 51 is sealed off by engagement of the table top with a boss 112 (Fig. 2) which extends downward from head plate 55. A gasket 113 may be provided to insure a tight seal. Another bushed throat opening 239 extends through the head plate 55 to provide acoustic communication between the standard cavity 51 and a housing 91 mounted on plate 59. An electroacoustical transducer or loudspeaker 89 is mounted in housing 91 on a bracket 93. The latter is fixed to the housing at 95 and the transducer is fixed to the bracket at 97 with its horn 81 directed downward.

A microphone 99 is recessed in head plate 55 in position to be in acoustic communication with standard cavity 51 when table 39 is raised. Microphones 101, 103, 105, 107, 109 and 111 are recessed in head plate 55 in position to be in acoustic communication with cavities 53 in the engine head block 49 when the latter is raised (note Fig. 2A). Each microphone may be of the carbon button type, or, according to the type of input circuit, of the crystal or ribbon type.

The transducers 63, 65, 67, 69, 71, 73 and 89 and microphones 99, 101, 103, 105, 107, 109 and 111 comprise the primary elements of the transducer and microphone unit C (Fig. 5). This unit also includes signal lights 121, 123, 125, 127, 129, 131, 133 and 135. As generally illustrated in Fig. 5, the unit C is under control of a stepper switch B for selectively testing the cavities 53. Testing is accomplished by causing the air mass within the standard cavity 51 acoustically to vibrate at its natural resonant frequency as determined by the volume of the cavity and the characteristics of the respective throat 239, and causing the air mass within a selected cavity 53 to vibrate at its natural resonant frequency as determined by the volume of the cavity and the characteristics of the respective throat 239. Vibration of the respective air masses is caused by energization of the master transducer 89 and the transducer for the particular cavity being tested.

The apparatus includes a sample amplifier A, a master amplifier D, a master frequency counter E, and a sample frequency counter F as previously mentioned in the general description relating to Fig. 1. The stepper switch B is provided selectively to couple the transducer and microphone assemblies for each of the sample cavities to be tested to the sample amplifier, so that the cavities may be tested rapidly one after the other, as will be made clear. The indicator unit X of Fig. 1 is replaced by a unit G comprising a tolerance indicator and certain control equipment to be described. A detailed description of the structure and operation of units A to G follows.

Any casual noise will change the flow of current through microphone 99 (Fig. 3), which is powered by a power supply 117 (Figs. 6 and 7). This noise starts a flow of current through the primary winding 163 of a transformer 165 of the master amplifier D (Fig. 7) and induces a potential across its secondary winding 167. This potential will thereby be present across a potentiometer 169, and a portion of this potential is impressed on the control grid 171 of a high-gain tube 173. Assuming for purposes of illustration that this potential is a positive one in reference to ground, tube 173 will conduct, causing a flow of current through cathode bias resistor 175, by-passed with a cathode condenser 177, and also causing a flow of current through plate load resistor 179 and decoupling resistor 181 (by-passed with decoupling condenser 183). The drop in potential caused by current flow through plate load resistor 179 is coupled through coupling condenser 185 to the primary winding 187 of transformer 189 and thereby causes a change in potential across secondary winding 191. This potential is impressed upon the control grid 193 of a variable mu tube 201 through a phase adjusting circuit consisting of an inductance (secondary winding 191), a capacitance (variable condenser 195) and a resistance (potentiometer 197). Assuming for this initial state that tube 201 is conducting and the potential just impressed on control grid 193 is a negative one, the tube will conduct less (or possibly cut off if the negative potential is great enough) causing a decrease of current through cathode bias resistor 203, by-passed with cathode condenser 205, and will thereby cause a decrease in current through plate load resistor 199 and decoupling resistor 207 (by-passed with decoupling condenser 209). The screen grid 211 of tube 201 has impressed on it a constant potential supplied by a bleeder network consisting of resistor 213 and resistor 215, both by-passed by condenser 217. The decrease in plate current through plate load resistor 199 results in an increase in potential at the top of resistor 199. The latter is coupled to control grid 219 of a vacuum tube 223 through coupling condenser 208 and impresses the increase in potential across the grid resistor 221 for tube 223.

Assuming that tube 223 is not in a saturated condition (it may be very near cutoff), this increase in potential will cause tube 223 to conduct to a greater extent and thereby cause a greater flow of current through cathode bias resistor 225 (by-passed by cathode condenser 227), primary winding 229 of a transformer 230, and decoupling resistor 231 (by-passed by decoupling condenser 233). This change in current flow will cause a current to flow in secondary winding 235 of the transformer 230 which is coupled to energize transducer 89, and thus causes the "slug of air" in the respective throat opening 239 to oscillate. The movement of this "slug of air" will cause compression or expansion of the air in master cavity 51. Any compression or expansion of air in cavity 51 will affect the microphone 99 and cause a change in the flow of current through the primary winding 163 of transformer 165.

Due to the predeterminately arranged inherent electrical characteristics of the circuit of the master amplifier unit D and the feedback arrangement between transducer 89 and microphone 99, an electrical oscillation will be set up in the master amplifier D and an acoustic oscillation will be set up in master cavity 51. These oscillations are mutually dependent. However, once the electrical oscillations are started by a casual noise as mentioned, they will be sustained by the feedback system employed and both acoustic and electrical oscillation will continue, providing that the potentiometer 169, potentiometer 197, and variable condenser 195 are properly adjusted, as will be later described.

The frequency of the electrical and acoustic oscillations is then the same and is dependent upon the volume of the master cavity 51 as mentioned previously.

The operation, construction, circuits, and all component parts of the sample amplifier unit A are respectively identical with those of the master amplifier unit D and are therefore identically indexed, as shown. The sample amplifier A, as will be shown later, can be switched easily and rapidly from one to another of the cavities 53 by means of the stepper switch B (Fig. 6).

During operation the wave-forms on the control grids 171, 193 and 219 are substantially sinusoidal and the tubes 173, 201 and 223 will operate between the limits of cutoff and saturation. Tube 173 is biased by cathode bias resistor 175 and cathode condenser 177, the value of the latter being chosen to assure no degeneration. Tube 201 is biased by cathode bias resistor 203 and cathode condenser 205, the value of the latter being chosen to assure no degeneration. Tube 223 is biased by cathode bias resistor 225 and cathode condenser 227, the value of the latter being chosen to assure no degeneration. The source of power for tubes 173, 201 and 223 is power supply 119.

To prevent blocking due to overloading, and to maintain the acoustic and electric oscillations at a substantially constant amplitude, both the master and sample amplifiers are provided with an automatic volume control circuit. These circuits are fed respectively from secondaries 241 of the transformers 230 in the respective amplifiers. Both automatic volume control circuits are identical and are identically indexed in Figs. 6 and 7. Each circuit includes the secondary 241 of transformer 230 coupled to apply a potential across plates 243 and 245 of an automatic volume control tube 247 of the duo-diode type. This potential results from the current induced in secondary 241 by the sinusoidal current developed in the primary 229 of transformer 230. The plates 243 and 245 generally are different in polarity.

The cathode 249 of tube 247 is at a potential (of +20 volts for example) which is supplied by power supply 238. When the master oscillator D, and sample oscillator A, start to operate they will tend to drive themselves to a point where one of the tubes 173, 201, or 223 becomes saturated or cut off. However, as the output of tube 223 increases over a certain value causing the potential across secondary winding 235 to exceed 20 volts, tube 247 will conduct, causing a flow of current through load resistor 251. The potential across load resistor 251, caused by the aforementioned flow of current, is impressed upon control grid 193 through line 137, resistor 253, potentiometer 197, and variable condenser 195. This variation in potential will automatically bias tube 201, decreasing its gain as the potential across secondary winding 241 increases. This system tends to keep the output of tube 223 at a constant level in amplitude. Decoupling resistor 253 and decoupling condenser 255 prevent any undesired load variations on tube 247 from being reflected along line 137 to control grid 193.

The output of a secondary winding 257 of transformer 230, a sinusoidal type wave, substantially constant in amplitude, is impressed on control grids 259 and 261 of two vacuum tubes 263 and 265 (Fig. 8) through two grid bias resistors 267 and 268. The tubes 263 and 265 are connected in a modified push-push circuit, and the potentials on control grids 259 and 261 will, therefore, at any instant, generally be opposite in polarity.

Starting at an instant when the potential of control grid 259 is increasing positively, current will be drawn through cathode resistor 271, causing an increasing positive potential at the top of this resistor 271, which will increase the potential of the top plate of a condenser 295 and a plate 273 of a duo-diode tube 283. Increasing current will thus flow through a resistor 285 (in unit E) or 301 (in unit F), increasing the potential at cathode 287 of tube 283.

Taking another instant, this time when the potential of control grid 261 of tube 265 is increasing positively, the potential at the bottom of a cathode resistor 269 is increasing positively due to the increasing current which is being drawn through it by the greater conduction of tube 265. This increasing potential is impressed upon plate 275 of tube 283 and the bottom plate of condenser 295. This increasing potential at plate 275 will cause the potential across the resistor 285 (in the counter E) or 301 (in the counter F) to increase.

The values of the circuit components are so chosen as to keep the discharge times of coupling condensers 291 and 293 substantially greater than that of condenser 295. The potential across resistor 285 or 301 is caused to increase with an increase in input frequency to the control grids 259 and 261 and to decrease with a decrease in input frequency to control grids 259 and 261. Therefore, as the input sinusoidal wave impressed on control grids 259 and 261 is substantially constant in amplitude, the potential across resistor 285 or 301 is dependent only on the natural resonant frequency of the tested cavities, the potentials rising with an increase in frequency, and decreasing with a decrease in frequency.

Resistor 297 is an additional cathode bias resistor used in common by tubes 263 and 265. The power supply 299 is the source of power for tubes 263, 265 and 283. The circuit, operation, construction and all component parts of the master frequency counter E and the sample frequency counter F are identical.

Referring now more particularly to the tolerance indicator and control equipment unit G, Fig. 8, reference numeral 139 indicates a three position ("manual", "off" and "automatic") switch having three sets of contacts 357, 373, and 401. Only contacts 401 are closed in the "off" position, contacts 357 and 373 remaining open.

The D. C. potentials of resistors 285 and 301 may be compared by positioning switch 139 in its "off" position thus connecting the potential across resistor 285 in opposition to the potential across resistor 301 through contacts 401 of switch 139, contacts 351 and 353 of a relay coil 335 (which is energized in the "off" position of switch 139) and through a meter 303 (a micro-ampere indicating galvanometer) and a potentiometer 313.

With the switch 139 in the "off" position and a contact arm CA of stepper switch B aligned on contacts 161, 761, 861, and 961 (Fig. 6), it will be noted that microphone 99, master cavity 51, and transducer 89 all are common to both master amplifier D and sample amplifier A through contacts G and H. Light 121 (which may be labeled "standardize") is now powered by power supply 323 (Fig. 8) through contact I, and is therefore lighted. Therefore, if everything is functioning properly, the potential at the top of resistor 285 and at the top of resistor 301 will be equal and no current will flow through meter 303, potentiometer 313, or the meter 305 (an adjustable "Sensitrol" type galvanometer with magnetic contacts 307 and 309), which is connected together with a potentiometer 315 in parallel with meter 303.

The electronic adjustments may now be made as follows: These adjustments should be made when arms 311 and 312 of potentiometers 313 and 315 respectively are at the extreme left (minimum resistance). This will give maximum sensitivity to meters 303 and 305. Potentiometers 169 are adjusted, if there is an excessive or off scale reading on meter 303, to a point where the meter 303 gives the minimum plus or minus deflection. This adjustment is rarely necessary.

Potentiometers 197 and variable condensers 195 in each of the amplifier circuits A and D are adjusted until the phase shifts (of the common input signal through master amplifier D and sample amplifier A) are proper for oscillation around through the acoustical path, and until the electronic characteristics of the unit D and the unit A become such that there is the correct phase relationship between the period of the master cavity 51 and the phase shifts through the master amplifier D and the sample amplifier A. This will give full amplification to any casual sound initially picked up by any of the microphones 99, 101, 103, 105, 107, 109, and 111. Then micro-ampere indicating galvanometer 303 and galvanometer type relay 305 both should now read exactly mid-scale which indicates zero potential difference between the potentials across resistors 285 and 301.

Potentiometer 313 may then be adjusted so that it will give any desired scale reading of meter 303 per difference in volumes. Potentiometer 315 adjusts the sensitivity of meter 305 varying the tolerance limits of volume difference at which either of its two magnetic contacts 307 or 309 will be contacted by a contact arm 321.

A power supply 323 supplies power to the following units: a relay coil 325 of the stepper switch unit B (Fig. 6), a reset coil 327 of meter 305, a relay coil 329, a relay coil 331, a relay coil 333, a relay coil 335, and lights 121, 123, 125, 127, 129, 131, 133, 135, 317, 319.

To ascertain the respective volumes of cavities 53 or their respective volume differences as compared to master cavity 51, the stepper switch unit B is provided either automatically or manually to connect separately and in sequence each of the six cavities 53 to the sample amplifier A. The master cavity 51 remains connected always to master amplifier D.

Such "manual" operation may be accomplished as follows:

With the switch 139 in "manual" position and contacts G, H, I and J of arm CA aligned over contacts 161, 761, 861, and 961, respectively, the only relay coils activated are relay coils 325 (Fig. 6) and 335 (Fig. 8), and the only light in operation is light 121, providing that all adjustments previously mentioned are correctly made.

When in the "manual" position, switch 139 has contacts 357 closed and contacts 373 and 401 open. In the "off" position, switch 139 has only contacts 401 closed.

As relay coil 325 is energized when switch 139 is in "manual" position, its action will now be described. It is energized by power supply 323 (Fig. 8) through contacts I and J, wire 345, contact arm 363, contact 369 and resistor 371. As soon as this potential from power supply 323 is applied across relay coil 335, relay coil 335 will move contact arms 349 and 351 upward, connecting contact arm 351 to contact 353.

When switch 139 is moved to the "off" position, the contacts 401 are closed and meters 303 and 305 are then connected between master frequency counter E and sample frequency counter F.

In the "off" position, contact 357 of switch 139 is open, removing any potential from relay coil 325. When switch 139 is moved back again to the "manual" position, relay coil 325 is energized which causes arm 359 to move upward and through a mechanical linkage 360 move ratchet wheel 361 clockwise to a position where contact arm CA is aligned on contacts 941, 841, 741 and 141. Although pictured for simplicity as a 90° section in Fig. 6, stepper switch B is a circular switch with contacts evenly spaced around its periphery. By alternately moving switch 139 between "off" and "manual" positions, coil 325 is alternatively energized through wire X, contacts 357 and wire IX from battery 323. This will cause contact arm CA to move in a clockwise direction and rest on contacts 141, 143, 145, 147, 149 and 151, in the order mentioned.

Meters 303 and 305 are energized only when the arm CA is over any of the contacts 961, 941, 943, 945, 949 and 951 and switch 139 is in the "off" position. Thus, when the arm CA is moving between contacts, meters 303 and 305 are disconnected because such movement of arm CA occurs only when switch 139 is in "manual" position and when in this position contacts 401 are open and the circuit between resistors 285 and 301 is broken. Lights 135, 133, 131, 129, 127 and 125 will each be lighted when contact I is contacting contacts 841, 843, 845, 847, 849 and 851, respectively.

Thus, by alternately moving the switch 139 between the "manual" and "off" positions arm CA is advanced in clockwise steps, testing in sequence each of the six cavities 53, the action of master amplifier D and the master frequency counter E providing a standard D. C. potential across resistor 285 which is compared in sequence to each of the six D. C. potentials which will be impressed across resistor 301 as a result of the action of sample amplifier A and sample frequency counter F.

The arm CA may be returned to its starting position (aligned over contacts 959, 859, 759 and 159) by four more actuations of switch 139 between "manual" and "off" positions.

In the "automatic" position contacts 373 and 401 of switch 139 will be closed and contacts 357 will remain open.

Automatic operation is as follows: Assuming now that the contact arm CA is aligned on contacts 141, 741, 841 and 941 (Fig. 6), and switch 139 is in the "automatic" position, resistor 361 and condenser 347 (Fig. 8) will have impressed across them the potential of power supply 323, the connection being made through contacts 373 of switch 139. Condenser 347 will now charge through resistor 361 and after the time required for this charging, relay coil 333 will be activated, causing contact arms 363 and 365 to move upward. When contact arm 363 connects with contact 371, power is supplied to relay coil 325, activating arm 359 and moving contact arm CA to a position aligned with contacts 143, 743, 843 and 943. The time required for condenser 347 to charge sufficiently (approximately one second with the component values used) is the time required to test the sample cylinder head 53 below the transducer 73. Resistor 361 may be made variable or condenser 347 may be replaced with several various size condensers and a switch arrangement so that the time that any one cavity is under test may be varied. Contact arm 365 will place resistor 367 across condenser 347, discharging it rapidly when contact arm 365 is in the upward position, and thereby rapidly releasing contact arms 363 and 365. The contact arms 363 and 365 are in the upward position only a few milliseconds. This time is determined by the values of resistor 367 and condenser 347. During these few milliseconds no potential will be present across relay coil 335, and contact arms 351 and 349 will be in the lower position which will deactivate meters 303 and 305. Therefore, during the time when contact arm CA is moving, the meters 303 and 305 will not be activated.

As soon as condenser 347 has discharged through resistor 367, contact arms 363 and 365 will move downward and the contact arm 363 will supply a potential through contact 369 to relay coil 335, causing contact arm 351 to be moved upwards, activating the meters 303 and 305 and thus completing one cycle of automatic operation. There is a small time delay required for relay coil 335 to reach the required potential to lift contact arms 349 and 351. This delay is determined by the charging time of condenser 375 and resistor 377 and will allow the master frequency counter E and sample frequency counter F to settle down, and allow condensers 291 and 293 to discharge before operation starts again.

This cycle will be repeated until the contact arm CA is aligned on contacts 153, 753, 853 and 953. When this condition exists, no potential from power supply 323 is applied to relay coil 333 through wire VIII, but potential is applied directly from power supply 323 to relay coil 325 of the stepper switch B through a pair of contacts 379 and 381. This is because there is no connection between contact 953 and line 345 as is the case with each of contacts 941, 943, 945, 947, 949 and 951. Arm 359 will be moved up and move contact arm CA one step clockwise as coil 325 is energized, and this action will, as contact arm CA moves clockwise, cause contact 379 to move away from contact 381, (contact arm 383 being so constructed mechanically as to maintain an electrical connection between contacts 379 and 381 when arm 359 is in lowered position) when contact arm CA has moved sufficiently clockwise. Contact 379 is insulated from projection 385.

As there is now no delay circuit because relay 333 is not energized when arm CA is over contacts 953, 955, 957 or 959, the contact arm CA will move clockwise very rapidly due to the making and breaking of contacts 279 and 281 by projection 385 until it reaches a position aligned on contacts 159, 759, 859 and 959, the rest position, when light 123 is lighted, indicating that contact arm CA is in the rest position. When switch 139 is in the "automatic" position and when arm CA is aligned over contacts 953, 955, 957 or 959 the meters 303 and 305 are deenergized. To start another cycle of "automatic" operation, switch 139 must be first switched to "off" position and then returned to "automatic" position. After the switch 139 is again in "automatic" position arm CA will move from a position over contact 959 to contact 961. Arm CA will remain in that position until condenser 347 has charged sufficiently to energize coil 333. During this charging interval the operator has time to check the readings of meters 303 and 305 to determine whether the apparatus is still standardized. The extra contacts made by arm CA, above, are for the purpose of taking care of eight-cylinder heads when desired. For the latter purpose additional resonance units and appropriate wiring are needed along the lines described herein regarding the six-cylinder set-up. As contact arm CA rotates, lights 135, 133, 131, 129, 127, 125 will be lighted when contact I is resting on contacts 841, 843, 845, 847, 849 and 851, respectively, and thus will indicate which of the sample six cylinder head cavities 53 is under test at any time.

Tolerance and volume indications are as follows: If we assume that the sample cavity 53 located under transducer 71 has a volume greater than the volume of the master cavity 51, and the volume difference between these two aforementioned volumes is greater than the desired tolerance, the following action will occur:

The natural frequency of resonance of the sample cavity 53 will be lower and as a result the potential across resistor 301 will be less than the potential across resistor 285. This potential difference will cause a current to flow down through meters 303 and 305 and to the right through resistor 315. Meter 303 will indicate the amount of volume difference in the desired units and the contact arm 321 of meter 305 will move to the right, contacting contact 307, and thus connecting relay coil 331 to power supply 323. This action will move contact arms 387 and 389 up, and allow relay arms 387 and 389 to make contact respectively with contacts 391 and 393. The connection of contact arms 387 and contact 391 will supply power from power supply 323 to light 319 which will therefore light, indicating that the sample cavity 53 being tested is greater than maximum desired tolerance. The connection between contact arms 389 and 393 effectively places resistor 367 across condenser 347. This will prevent any flow of current through coil 333 and thus prevent relay contacts 363 and 365 from moving upwards. Thus movement of arm CA wil be stopped because while switch 139 is in the "automatic" position energy is supplied to coil 325 only through contact 371 of relay coil 333 (except when arm CA is over contacts 953, 955, 957 or 959).

As the relay coil 335 is kept activated through contact 369, contact arm 351 and contact 353, meters 303 and 305 will remain in the circuit between resistors 285 and 301, thus indicating the exact amount of volume difference between the cavity 53 under test and the master cavity 51.

If the sample cavity 53 to be tested has a smaller volume than the desired tolerance limits will allow, the above action, described in the preceding two paragraphs, takes place with only the following differences: Contact arm 321 will connect to contact 309, instead of contact 307, and will activate relay coil 329 instead of relay coil 331. This results in contact arm 403 being connected to contact 405 and power will be supplied to light 317, indicating that the negative tolerance limit has been exceeded. This occurs instead of contact arm 387 connecting to contact 391 and supplying power to light 319, as was the case when the volume of the sample cylinder head 53 was too great to be within the tolerance limits desired.

If switch 139 is in the "automatic" position, contact arm CA will stay in its last-mentioned position, due to the fact that contact 371 is not connected to contact arm 363, and consequently the potential of power supply 323 cannot be applied to relay coil 325. Unless relay coil 325 has a potential impressed across it, contact arm CA cannot move.

After the volume difference on meter 303 has been noted, a switch 407 (Fig. 8), which can be designated as a "reset" switch, must be moved to the right, connecting contacts 409 and 411 respectively to contacts 413 and 415, before the testing operation of the device may be continued. When contact 413 is connected to contact arm 403, relay coil 327 has the potential of power supply 323 impressed across it. Relay 327 being thus activated, it will reset contact arm 321 of meter 305 to a position where it is substantially equidistant from contacts 309 and 307, whether contact arm 321 was connected with either contact 309 or 307. The second and final action resulting from the movement of switch 407 to the right is that power is supplied to relay coil 333 through resistor 417 and contacts 411 and 415 of switch 407. This action will move contacts 363 and 365 up and power will again be applied to relay coil 325 and contact arm CA of stepper switch B can continue moving clockwise. If switch 139 is in the "manual" position it will have to be moved to the "off" position and then back to the "manual" position to move contact arm CA to an adjacent clockwise position.

Thus, the embodiment of Figs. 2–8 will either manually or automatically compare each of the unknown volumes of sample cavities 53 in sequence to the known volume of the master cavity 51 and indicate the volumes of each of the unknown cavities 53 as a function of the difference in volume between master cavity 51 and the particular cavity 53 being tested. In addition to indicating the volume of the cavity 53 by meter 303, meter 305 may be adjusted by means of potentiometer 315 to any desired tolerance limits, either plus or minus, and cause either light 319 or 317 to be illuminated, indicating when either tolerance limit has been exceeded. Means are provided in unit G for causing all movement of the stepper switch unit B to cease whenever tolerance limits are exceeded, and other means are provided in unit C for indicating which of the cavities 53 is under test at any time.

It is to be noted that in this embodiment ambient temperature and humidity changes do not affect the accuracy of measurement because the master cavity 51 is always being compared simultaneously with any one of the cavities 53 under test, and as cavities 53 are always in proximity with cavity 51 any changes in external conditions will effect them all substantially equally. Thus, the apparatus and scheme of the embodiment of Figs. 2–8 is automatically self-compensating as to ambient temperature and humidity variations.

However, such simultaneous comparison is not necessary to obtain a high degree of accuracy of volumetric measurement. Other embodiments of the present invention are described hereinafter which do not require simultaneous comparison of a standard or master cavity and an unknown cavity. Such embodiments preferably have some means of maintaining the temperature of the air mass within the throat substantially constant. In such embodiments, the volume of the cavities being tested may be indicated by means which is initially calibrated and checked at infrequent intervals with a standard or master cavity. The volumetric units of measurement of such indicating means may be calibrated either in absolute volume units or in units which indicate a difference from some predetermined standard which is represented as "zero" on the indicating means. Figs. 9–12 illustrate one such embodiment.

Referring now more particularly to Fig. 9, numeral 423 indicates a cavity the volume of which is to be determined. A transducer 425 is mounted in a housing 427 having a throat 431 at its lower extremity. The throat 431 is in acoustic communication with the cavity 423. The transducer 425 and a microphone 433 are mounted for convenience in this embodiment on a cover or closure 434 member adapted to be fitted over the cavity 423 to be tested. The microphone 433, in acoustic communication with the cavity 423, is connected by wires 435 and 437 to the input of an amplifier H. The amplifier H is connected in cascade with an automatic gain control unit I, an amplifier unit J, a phase shifting network unit K, and an amplifier unit L. One output of amplifier L is electrically connected through wires 439 and 441 to the transducer 425. A second output of amplifier L is connected to the automatic gain control unit I by means of two wires 443 and 445. A third output of amplifier L is connected to a frequency discriminator unit N by means of wires 447, 449, 451 and 453. The output of frequency discriminator N is fed to an indicator unit O. A power supply M supplies power to the units H, I, J and L. A power supply P provides a source of direct current for the indicator unit O.

Referring now to Fig. 10 the detailed electronic circuits of the units H, I, J, K, L and M are shown. The wires 435 and 437 connect the microphone 433 to the grid circuit of a vacuum tube 455. The circuit elements of tube 455 include a grid resistor 457, a cathode resistor 459, a plate load resistor 461, a decoupling condenser 463 and a decoupling resistor 465. A coupling condenser 467 interconnects the plate circuit of tube 455 to a second amplifier tube 469. The circuit elements of tube 469 include a grid resistor 471, a cathode resistor 473, a cathode by-pass condenser 475, a decoupling condenser 477, a plate load resistor 479 and a decoupling resistor 481. The plate circuit of tube 469 is interconnected by means of a feed-back circuit including a resistor 482 and condenser 483 to the cathode circuit of tube 455. A coupling condenser 485 interconnects the output of the amplifier unit H to the automatic gain control unit I. The unit I includes a duo-diode tube 487 and its associated circuit elements, namely, two coupling resistors 489 and 491, two load resistors 493 and 495, two bleeder resistors 497 and 499, a filter condenser 501, two by-pass condensers 503 and 505, and a series resistor 506.

A coupling condenser 507 interconnects the automatic gain control unit I and the amplifier unit J. The latter unit includes a vacuum tube 509 together with its associated circuit elements including a grid resistor 511, a cathode resistor 513, a decoupling condenser 515, a plate load resistor 517 and a decoupling resistor 519. The plate circuit of tube 509 is interconnected to the grid circuit of a vacuum tube 521 by means of a coupling condenser 523. The circuit elements of tube 521 include a grid resistor 524, a cathode by-pass condenser 525, a cathode resistor 527, a decoupling condenser 529, a plate load resistor 531 and a decoupling resistor 533. A regenerative feed back circuit is provided between the plate of tube 521 and the cathode of tube 509 including a condenser 535 and a resistor 537. The output of the amplifier unit J is interconnected to the phase shifting network K by means of a coupling condenser 539.

The circuit elements of the phase shifting network K include three series resistors 541, 543 and 545, a series potentiometer 547 and three condensers 549, 551 and 553.

A wire 555 interconnects the phase shifting network unit K with the grid of a vacuum tube 557 of amplifier unit L. The circuit components of the amplifier unit L include a cathode resistor 559, a decoupling condenser 561, a plate load resistor 563, and a decoupling resistor 565. The plate circuit of tube 557 is coupled by a condenser 566 to the grid of a power pentode tube 567. The circuit elements of the tube 567 include a cathode by-pass condenser 569, a cathode resistor 571, a screen by-pass condenser 573, a resistor 575 and the primary 577 of an output transformer 579. The transformer 579 has four secondaries 581, 583, 585 and 587. The secondary 587 of transformer 579 is connected by means of wires 439 and 441 to the transducer 425. A regenerative feed-back circuit including a resistor 591 is provided between this secondary 587 and the cathode of tube 557. The secondary 585 supplies a bridge rectifier unit 589 which in turn, through wires 443 and 445 supplies a D. C. control potential to the automatic gain control unit I.

The power supply M includes a transformer 593, and a duo-diode rectifier tube 595 connected in a full wave rectifier circuit. A secondary winding 597 of transformer 593 supplies the heaters of all of the tubes in the units H, I, J, K, L and M. The power supply M includes a pi filter network including a choke 599, two filter condensers 601 and 603 and a resistor 605. Two voltage regulator tubes 607 and 609 are series connected to provide different voltage-regulated potentials for the component units shown in Fig. 10. The primary of transformer 593 is energized from any suitable A. C. source L–1, L–2 through a series fuse 611 and through the internal contacts of the voltage regulator tubes 607 and 609 so that when either of these tubes is removed from its socket the primary circuit of transformer 593 will be broken.

The transducer throat 431 is provided with a heating element 613 the temperature of which is controlled by an internal thermostat unit 615 so as to maintain the temperature of throat 431 substantially constant. The power for this heater unit 613 is supplied by means of a transformer 617 from power source L–1, L–2.

Any ambient noise will energize the microphone 433 to cause an electronic impulse to be transmitted to the amplifier unit H. The amplified signal will be conducted to the automatic gain control unit I which will maintain the amplitude of such amplified signal substantially constant. The output signal of the automatic gain control unit I is cascaded into the amplifier unit J, amplified, and transmitted to the phase shifting network K. The function of unit K is to provide the correct phase relationship between the period of resonance of the cavity 423 and the phase shift through the electronic circuits of the units H, I, J and L. The potentiometer 547 of unit K (Fig. 10) provides means for adjusting this phase shift. The phase-shifted and amplified signal from unit K is transmitted to the amplifier unit L, the amplified output of which is conducted to the transducer 425 by means of wires 439 and 441. The electrical energization of the transducer 425 will cause mechanical vibration of its diaphragm and compression and expansion in the air contained in the housing 427, which in turn will cause the mass of air contained in the throat 431 to oscillate. This air movement will acoustically energize the air contained in the cavity 423. Thus, an oscillatory electronic circuit is set up through units H, I, J, K and L which will serve to sustain an acoustic oscillation in the cavity 423, the frequency of the acoustic and electronic oscillations being a function of the diameter and the length of the throat 431 and the volume of the cavity 423. The amplitude of these oscillations is maintained substantially constant by the action of the automatic gain control unit I. Thus, the electronic output of the amplifier unit L from the two secondaries 581 and 583 is an A. C. wave of substantially constant amplitude, the frequency of which is a function of the volume of the cavity 423.

As shown in Fig. 9, the output of the amplifier L is connected to the frequency discriminator unit N, the detailed circuit arrangement of which will be described. The output of the frequency discriminator N is a D. C. signal, the potential of which is dependent upon the frequency of the oscillation supplied to the frequency discriminator unit N from the amplifier unit L. The output of the frequency discriminator unit N is fed to the indicator unit O which includes a galvanometer 679 (Fig. 11) for indicating the volume of the cavity 423 being tested.

The apparatus is calibrated by applying the throat 431 to a master cavity of known volume, causing it to resonate at its natural resonant frequency, and adjusting indicator O for a desired reading, usually a zero reading, in accordance with this frequency. Thereafter, the volume of a sample cavity may be determined by applying the throat 431 to this cavity, causing it to resonate, and noting the reading of the indicator O as a measurement of cavity volume. Since the temperature of the throat is maintained constant, the apparatus is substantially unaffected by differences of ambient temperature variations at the time of calibration and the time of testing the sample.

Referring now more particularly to Fig. 11, wherein the circuit details of the frequency discriminator unit N, the indicator unit O and the power supply unit P are illustrated, unit N is shown to be provided with two pairs of input wires, wires 447 and 449, and wires 451 and 453. The former pair of wires is connected to the transformer winding 581 and the latter pair of wires is connected to the transformer winding 583. One input circuit of discriminator unit N fed by wires 447 and 449 includes a potentiometer 619, the adjustable arm of which is connected to four paralleled condensers 621, 623, 625 and 627. One side of the potentiometer 619 is connected to a choke 629 which is series connected with a condenser 631 and a dry rectifier 633. A resistor 635 is connected in parallel with condenser 631.

A similar arrangement of circuit elements is provided for the input circuit of discriminator N fed by wires 451 and 453. This circuit includes a potentiometer 637 the adjustable arm of which is connected to four paralleled condensers 639, 641, 643 and 645. A choke 647 is series connected with a dry rectifier 649, condenser 651 and resistor 653. The circuit fed by the wires 447 and 449 is connected in series with the circuit fed by the wires 451 and 453 by a wire 655. The electrical output of discriminator unit N is impressed across wires 657 and 659, wire 659 being by-passed by a condenser 661.

The D. C. output of the discriminator unit N is transmitted to the indicator unit O by means of wire 657. The input circuit of unit O is provided with a switch 663 and a series resistor 665. Two pentode tubes 667 and 669 which are connected in a modified push-pull arrangement are included in the circuit of unit O. These tubes 667 and 669 are provided with cathode resistors 671 and 673, respectively, as well as with a common cathode resistor 675. A condenser 677 is connected between the grid circuit of tube 667 and the common cathode resistor 675. A galvanometer 679 of the D'Arsonval movement, microammeter type is connected in a series circuit with a resistor 681 and a potentiometer 683. This series circuit is connected between the plate and the screen grid of tube 667 and the plate and screen grid of tube 669. Also connected between the plate and screen grid of tube 667 and the plate and screen grid of tube 669 are two resistor 685 and 687 series connected with a potentiometer 689. The adjustable arm of potentiometer 689 and the common cathode resistor 675 are connected by two wires 691 and 693 respectively to the power supply unit P. Power supply unit P includes a multiwinding power transformer 695 the primary of which is powered from any suitable A. C. source L–1, L–2. A duodiode vacuum tube 697 is connected in a full-wave rectifier circuit, the D. C. output of which is filtered by means of a filter network including condensers 699 and 701 and resistors 703 and 705. A voltage regulator tube 707 is connected across the D. C. output of this filter network. Connected in parallel with the voltage regulator tube 707 are three series connected resistors 709, 711 and 713. Similarly connected in parallel with the voltage regulator tube 707 are two resistors 715 and 717 and a potentiometer 719, the adjustable arm of which connects to the discriminator unit N through wire 659. The connection between resistors 711 and 713 is grounded.

The operation of the discriminator unit N, the indicator unit O and the power supply unit P is as follows:

The alternating current outputs of transformer windings 581 and 583 (see Fig. 10) are supplied by the pair of wires 447 and 449 and the pair of wires 451 and 453 to the potentiometers 619 and 637, respectively. The frequency of these A. C. outputs is dependent upon the volume of the cavity 423 being measured. The action of the circuit elements associated with potentiometer 619 (elements 621—635) transforms the alternating current input across the terminals of the potentiometer 619 into a D. C. potential which is impressed across the wires 655 and 659. The rectified D. C. output of the circuit elements associated with the potentiometer 637 (elements 639—653) is impressed across the wires 655 and 657 as a second D. C. potential. These two D. C. potentials are series connected by means of wire 655 and thus cause a potential to be impressed between wires 657 and 659, which D. C. potential is a function of the volume of the cavity 423 being measured.

The D. C. potential of wire 657 is impressed through the switch 663 and the resistor 665 upon the grid of tube 667 of the indicator unit O. The D. C. potential level transmitted to the control grid of the tube 667 will determine the current which will flow through the galvanometer 679 as the control grid of tube 669 is connected directly to ground. Thus, the reading of the galvanometer 679 is dependent upon the D. C. potential level impressed upon the grid of tube 667.

Adjustments of the discriminator unit N, the indicator unit O and the power supply unit P are made as follows:

To eliminate any effect due to the particular characteristics of either tube 667 or tube 669, the arm of switch 663 is rotated until resistor 665 is grounded. Then with the adjustable arm of potentiometer 683 at its upper limit, the potentiometer 689 is adjusted until the galvanometer 679 is centered at zero.

The potentiometers 619 and 637 are then adjusted so that the total and relative percentages of the outputs of windings 581 and 583 of the transformer 579 produce D. C. voltages of opposite polarity which are proportional to a particular frequency span of the range of the units H, I, J, K and L.

The arm of potentiometer 719 is adjusted to compensate for any small amount of drift that may occur during operation of the discriminator unit N. By adjusting this potentiometer 719 a small D. C. potential may be added or subtracted to the D. C. output present across the wires 657 and 659.

The sensitivity of the galvanometer 679 may be adjusted by means of the potentiometer 683. This adjustment varies the constant of meter 679 within a limited range.

Thus, the reading of galvanometer 679 is a function of the volume of the sample cavity being measured. If the volume of the sample cavity is the same as that of the master cavity, the galvanometer reading is zero. Its needle will swing one way or the other from zero depending upon whether the sample cavity is of greater or lesser volume than the master cavity.

Figure 3:
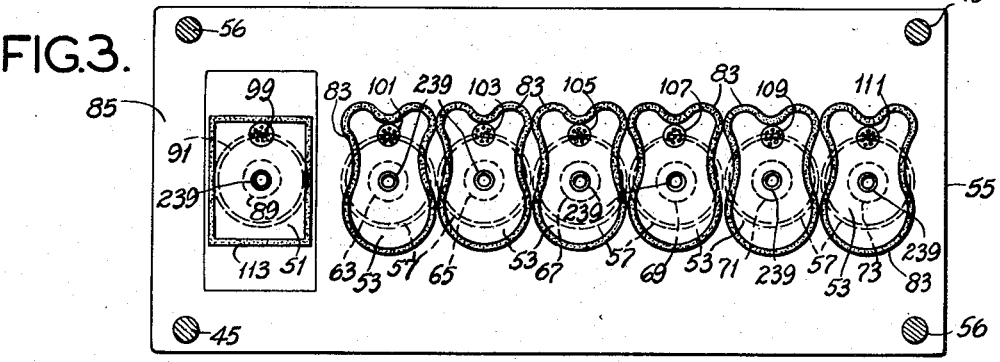
Fig. 3 is a horizontal section taken on line 3—3 of Fig. 2.

It will be understood that the apparatus of Figs. 9–11 may be adapted for rapidly determining the volumes of a plurality of cavities such as the cavities in the head block of an internal combustion engine by utilizing a plurality of throats, transducers and microphones, a stepper switch, a tolerance indicator and control equipment as described in connection with Figs. 2–3.

The frequency discriminator N, indicator O, and power supply unit P may be replaced by a frequency meter Q (Fig. 12) having four terminals for connection to wires 447, 449, 451 and 453. This meter indicates the frequency of the A. C. output of amplifier L as a function of the volume of the cavity under test.

Fig. 13 illustrates a further embodiment of the invention wherein the indication of the volume of a cavity as a function of its natural resonant frequency is obtained by means of a phase shift indicator, particularly an oscilloscope. There is shown at 721 an electroacoustic transducer, for example, a permanent magnet loudspeaker. The transducer is mounted at the upper end of a housing 722 having a throat 725 at its lower end. The throat is adapted for insertion into an aperture in a closure for a cavity 723. A velocity type microphone 727 is mounted within housing 722 as nearly in the throat as possible. A throat heater 729 is energized from any suitable power source L–1, L–2 and controlled to maintain the throat at a substantially constant temperature by a thermostatic switch 730.

The microphone 727 is coupled through a transformer 731 to the horizontal plates of a cathode ray tube 732 of an oscilloscope 733.

The transducer 721 is energized by a variable frequency audio oscillator 735, the output of which is coupled to the transducer by a transformer 737 and wires 739 and 749. The oscillator also energizes a phase shift network 738 having as circuit elements thereof a condenser 742 and a potentiometer 744. The output of the phase shift network is coupled to the vertical plates of the cathode ray tube 732. The oscillator 735 has a frequency controller 746 by means of which the frequency of its output may be varied.

Assuming that the apparatus has been calibrated, the volume of a cavity may be determined by applying the throat 725 to the cavity so that the air therein may be caused to oscillate at its natural resonant frequency as determined by its volume. The throat 725 in this instance is particularly adapted for insertion into the spark plug opening of an internal combustion engine so that the volume of a cylinder therein may be measured without removing the head block. Cylinder volume thus may be determined at any desired displacement of the piston in the cylinder.

The audio oscillator 735 is then energized and frequency controller 746 is adjusted to energize transducer 721 to cause the air within the cavity under test to oscillate at its natural resonant frequency as determined by the volume of the cavity. The proper adjustment of controller 746 to bring this about is determined by viewing the oscillogram on the fluorescent screen of the cathode ray tube. When the oscillator is adjusted to natural resonant frequency, the output of the microphone is a maximum. As the exact point of resonance is approached and passed, a phase change of nearly 180° takes place between the transducer 721 and the microphone 727. This phase change is very rapid. By adjusting the potentiometer 744 of the phase shift network so that the oscillogram appears as a straight line rather than as a circle or ellipse, it is readily apparent from the oscillogram when the frequency controller 746 is properly adjusted, and the controller thus may be easily and accurately set. The adjustment of controller 746 that causes a straight line of maximum length and at an angle of 45° to appear upon the screen of the cathode ray tube is the proper adjustment for resonance. The controller 746 may be calibrated in units of volume by reference to a master cavity of known volume.

If a series of cavities differing only slightly in volume are to be tested, volume may be measured by holding the frequency of the output of the audio oscillator 735 constant and adjusting the potentiometer 744 to obtain the proper oscillogram. Then by calibrating the potentiometer in units of volume, the volume of a test cavity may be read directly from the potentiometer adjustment.

Another mode of utilization of the apparatus of Fig. 13 to measure volume involves holding both the frequency of the output of oscillator 735 and the phase adjustment of network 738 constant and varying the characteristics of the throat 725. For example, the length of the throat may be varied while maintaining its cross-sectional area constant. How this may be accomplished is illustrated in Fig. 14, to be described. Similarly, the throat area may be varied and the throat length may be maintained constant. As a variation in either the throat length or the throat area inherently causes a change in the resonant frequency of the cavity and throat assembly, this variation may be used to determine differences in volumes of cavities. If a cavity of known volume is tested at one setting of throat length, and the phase shift network 738 and the controller 746 of the audio oscillator 735 are adjusted until the proper oscillogram is obtained on the screen of tube 732, any cavity of unknown volume may be measured by applying the throat 725 to the cavity and varying the throat length until the oscillograph pictured on tube 732 is returned to its proper indication. By reading the calibrations on the throat length adjustment, the difference in volume may be determined. Similarly if the throat area is made variable and such adjustment is calibrated, the amount of adjustment of throat area required to bring the oscillograph back to its original 45° straight line condition will be a measure of the volume difference between a master and a sample cavity.

A still further mode of utilizing the apparatus of Fig. 13 to determine volume is to utilize displacement volumes. In this method the oscillogram on tube 732 is adjusted to its reference condition while testing a standard cavity. Then the throat 725 is applied to a cavity 723 of unknown volume. Small bodies of known volume may then be dropped into the cavity 723 until the oscillogram on tube 732 is brought to its reference point. The total volume of the bodies dropped into the cavity is equal to the difference in volume between the cavity being measured and the standard cavity.

Fig. 14 illustrates a transducer and housing assembly having a throat of adjustable length for use in the manner above described. The assembly comprises a cylindrical housing 748 within the upper end of which an electroacoustical transducer or loudspeaker 750 is resiliently mounted. The transducer is carried by a mounting plate 752 which engages a rubber ring 754 on an internal annular shoulder 756 of the housing. A rubber ring 758 is interposed between the upper end of the transducer and an apertured cap 760 closing the upper end of the housing.

A cup-shaped member 762 is fixed within the lower end of housing 748 as by screws 764. The bottom of the cup 762 has a central aperture 766. A conical wall 768 diverges downward from the bottom of the cup providing a conical aperture leading from the aperture 766. The upper end of the cup and the lower end of the cone 768 are sealed by thin resilient diaphragms 770 and 772, respectively.

A fitting 774 is adjustably threaded at 776 in the cup 762. This fitting has a depending sleeve 778 which is telescopically slidable in the aperture 766 to form a throat of adjustable length. The sleeve is thin and counterbored at its lower end to provide a substantially smooth internal wall for the throat. The fitting has an upstanding cylindrical wall 780, the outer periphery of which is spaced inward from the interior surface of the wall of cup 762 and is knurled as indicated at 782. An access aperture through the housing 748 and the wall of cup 762, normally closed by a screw 784, provides for insertion of a suitable tool to rotate the fitting 774 to adjust sleeve 778 and to view the adjustment thereof. Upward movement of the fitting 774 is limited by a stop 786 to prevent withdrawal of the thin sleeve 778 from within the aperture 766.

An electrical heating coil 788 is wound around the cone 768 to heat the throat. A thermostatic switch 790 is recessed in the base of cup 762 and is connected in series with the coil to maintain the throat at a constant temperature.

The arrangement is such that fitting 774 may be rotated relative to the housing 748 and cup 762 to telescope the sleeve 778 into or out of aperture 766 adjustably to vary the length of the throat.

The transducer and housing assembly of Fig. 14 may be used, in conjunction with an associated microphone unit, to measure cavity volumes as described previously in regard to Figs. 1 and 13. For example, by connecting wires 739 and 740 to transducer 750 and placing a microphone (connected to transformer 731) in acoustical communication with cavity 723, the volume of the latter cavity could be determined.

It will be understood that each of the above-described embodiments of the invention utilizes the fundamental principle that the natural sonic frequency or resonance of a cavity having a throat is dependent only upon the volume of the cavity and the characteristics of the throat, regardless of the irregularity of the shape of the cavity. This principle is utilized by causing the air within the cavity to oscillate at the natural resonant frequency by means of an electroacoustic transducer, and converting this sonic oscillation to an electrical oscillation, the frequency of which is determined as an accurate measure of cavity volume. The various embodiments of the invention operate best when the greatest depth of cavity opposite the throat is appreciably less than one-fourth of the wave length of the natural resonant frequency of the cavity, but they will operate satisfactorily if the depth is greater than this value, though with less sharply defined results.

In view of the above, it will be seen that the several objects of the invention are achieved and other advantageous results attained.

As many changes could be made in the above constructions without departing from the scope of the invention, it is intended that all matter contained in the above description or shown in the accompanying drawings shall be interpreted as illustrative and not in a limiting sense.

We claim:

1. Apparatus for measuring the volume of a sample cavity in a body, comprising a member having a throat for application to said body to convert it to a single-throated resonator, a body having a master single-throated cavity of known volume, means carried by said member in acoustic communication with the sample cavity through its throat for causing oscillation of the air therein at its natural resonant frequency, means in acoustic communication with the master cavity through its throat for causing oscillation of the air therein at its natural resonant frequency, and means including a receiver in acoustic communication with each of said cavities for measuring the difference in said frequencies as a measure of the volume of the sample cavity.

2. Apparatus for measuring the volume of a sample cavity in a body, comprising a member having a throat for application to said body to convert it to a single-throated resonator, a body having a master single-throated cavity of known volume, an electro-acoustic transducer carried by said member in acoustic communication with the sample cavity through its throat for causing oscillation of the air therein at its natural resonant frequency, an electroacoustic transducer in acoustic communication with the master cavity through its throat for causing oscillation of the air therein at its natural resonant frequency, microphones in acoustic communication with each of the respective cavities for converting said oscillations to equivalent electrical oscillations, and means coupled to the microphones for measuring the difference in frequencies of said electrical oscillations.

3. Apparatus for measuring the volume of a sample cavity in a body, comprising a member having a throat for application to said body to convert it to a single-throated resonator, a body having a master single-throated cavity of known volume, electroacoustic transducers in acoustic communication with the master and sample cavities, respectively, through their throats, the transducer in acoustic communication with the sample cavity being carried by said member, microphones in acoustic communication with the master and sample cavities, respectively, means responsive to the outputs of the respective microphones for energizing the respective transducers, thereby to cause oscillation of the air within the cavities at the respective natural resonant frequencies of the cavities, and means responsive to the difference in the frequencies of the outputs of the respective microphones.

4. Apparatus for measuring the volume of each of a plurality of cavities in bodies, comprising a member having a plurality of throats, one of said throats for application to each of said bodies to convert them into single-throated resonators, a plurality of electroacoustic transducers carried by said member, each of which is in acoustic communication with a cavity through its respective throat for causing oscillation of the air therein at its natural resonant frequency, a plurality of microphones, each of which is in acoustic communication with a cavity for converting the oscillation of the air therein to an electrical oscillation, a single means for measuring the frequency of the output of any microphone as a measure of the volume of the cavity with which it is in acoustic communication, and a selector switch connected in a circuit with said microphones for selectively coupling said microphones to said measuring means selectively to measure the volumes of said cavities.

5. Apparatus for measuring the volume of each of a plurality of cavities in bodies, comprising a member having a plurality of throats, one of said throats for application to each of said bodies to convert them into single-throated resonators, a plurality of electroacoustic transducers carried by said member, each of which is in acoustic communication with a cavity through its throat for causing oscillation of the air therein at its natural resonant frequency, a plurality of microphones, each of which is in acoustic communication with a cavity for converting the oscillation of the air therein to an electrical oscillation, an amplifier adapted to amplify the output of any one of said microphones, and a selector switch connected in a circuit with said amplifier for selectively coupling any of said microphones to said amplifier and for selectively coupling the output of said amplifier to the respective transducer, and means responsive to the output of said amplifier for indicating the frequency of its output as a measure of cavity volume.

6. Apparatus as set forth in claim 5, further including means for automatically actuating said selector switch to measure the volumes of the cavities in sequence, and a tolerance indicator responsive to the indicating means for indicating when the volume of any cavity exceeds predetermined tolerance limits.

7. Apparatus as set forth in claim 13, further including a controller responsive to actuation of the tolerance indicator to unacceptable limits for stopping the operation of the selector switch.

8. Apparatus as set forth in claim 5, further including means for automatically actuating said selector switch to measure the volumes of the cavities in sequence.

9. Apparatus as set forth in claim 5, further including a tolerance indicator responsive to the indicating means for indicating when the volume of any cavity exceeds predetermined tolerance limits.

10. Apparatus for measuring the volume of each of a plurality of sample cavities in bodies, comprising a member having a plurality of throats, one of said throats for application to each of said bodies to convert them into single-throated resonators, a body having a master single-throated cavity of known volume, a master electroacoustic transducer in acoustic communication with the master cavity through its throat, a master microphone in acoustic communication with the master cavity, a master amplifier fed by said master microphone and having its output regeneratively coupled to the master transducer in an oscillatory circuit, a plurality of sample electroacoustic transducers, each of which is carried by said member in acoustic communcation with a sample cavity through its throat, a plurality of sample microphones, each of which is in acoustic communication with a sample cavity, a sample amplifier adapted to amplify the output of any sample microphone, and a selector switch connected in a circuit with said sample amplifier for selectively coupling any of said sample microphones to the sample amplifier and for selectively regeneratively coupling the output of the sample amplifier to the respective sample transducer in an oscillatory circuit, and means responsive to the frequencies of the outputs of the master and sample amplifiers for indicating the difference in these frequencies as a measure of sample cavity volume.

11. Apparatus as set forth in claim 10, wherein the master and sample cavities are closely adjacent one another so as to be subjected to the same ambient temperature and humidity effects.

12. Apparatus for measuring the volume of each of a plurality of sample cavities in an engine head block or the like, comprising a table having a master cavity of known volume therein for supporting the block, a closure for closing the master and sample cavities having a plurality of throat openings therein to convert each of said cavities into single-throated resonators, a master electroacoustic transducer carried by the closure in acoustic communication with the master cavity through its throat, a master microphone carried by the closure in acoustic communication with the master cavity, a master amplifier fed by said master microphone and having its output regeneratively coupled to the master transducer in an oscillatory circuit, a plurality of sample electroacoustic transducers, each of which is carried by the closure in acoustic communication with a sample cavity through its respective throat, a plurality of sample microphones, each of which is carried by the closure in acoustic communication with a sample cavity, a sample amplifier adapted to amplify the output of any sample microphone, and a selector switch connected in a circuit with said sample amplifier for selectively coupling any of said sample microphones to the sample amplifier and for selectively regeneratively coupling the output of the sample amplifier to the respective sample transducer in an oscillatory circuit, and means responsive to the frequencies of the outputs of the master and sample amplifiers for indicating the difference in these frequencies as a measure of respective sample cavity volumes.

13. Apparatus for measuring the volume of a cavity in a body, comprising a member having a throat for application to the body to close the cavity except for the throat, the throat being of such cross section with respect to the cavity as to convert the body to a single-throated resonator, an electroacoustic transducer carried by said member for causing oscillation of the air in the throat and the cavity, a microphone carried by said member in position for acoustic communication with the cavity to convert the oscillation of air in the cavity to an equivalent electrical oscillation, means responsive to the oscillatory output of the microphone for indicating its frequency at resonance of the cavity as a measure of its volume, a heater in heat-exchange relation to the throat, and means for controlling the heater to maintain the throat at a substantially constant temperature.

14. Apparatus for measuring the volume of a cavity in a body, comprising a member having a throat for application to the body to close the cavity except for the throat, the throat being of such cross section with respect to the cavity as to convert the body to a single-throated resonator, an electroacoustic transducer carried by said member for causing oscillation of the air in the throat and the cavity, a microphone carried by said member in position for acoustic communication with the cavity to convert the oscillation of the air in the cavity to an equivalent electrical oscillation, an amplifying circuit for amplifying the oscillatory output of the microphone having its output regeneratively coupled to the transducer, said circuit including an automatic gain control for maintaining the amplitude of oscillation at resonance of the cavity substantially constant and a phase shifting network for maintaining the correct phase relation between the period of oscillation and the phase shift through the amplifying circuit, and means responsive to the amplified output of the amplifying circuit for indicating its frequency at resonance of the cavity as a measure of cavity volume.

15. Apparatus as set forth in claim 14, further including a heater in heat-exchange relation to the throat, and means for controlling the heater to maintain the throat at a substantially constant temperature.

16. Apparatus as set forth in claim 15, wherein said indicating means comprises a frequency discriminator circuit having its input coupled to the output of the amplifying circuit and adapted to convert said output to a D. C. voltage the potential of which is a function of the frequency of said output, and a meter for indicating the potential of said D. C. voltage.

17. Apparatus for measuring the volume of a cavity in a body, comprising a member having a throat for application to the body to close the cavity except for the throat, the throat being of such cross section with respect to the cavity as to convert the body to a single-throated resonator, an electroacoustic transducer carried by said member and positioned in acoustic communication with said cavity to cause oscillation of the air in the throat and cavity at the natural resonant frequency of said resonator, an audio oscillator for electrically energizing the transducer, a microphone in acoustic communication with the cavity, a phase shift indicator having first and second inputs, said first input coupled to the output of the microphone, and a phase shift network coupling the oscillator to said second input.

18. Apparatus as set forth in claim 17, further including a heater in heat-exchange relation to the throat, and means for controlling the heater to maintain the throat at a substantially constant temperature.

19. Apparatus as set forth in claim 17, wherein the phase shift network includes a control for adjustably varying the phase of the input of the oscillator to the indicator.

20. Apparatus for measuring the volume of a cavity in a body comprising a member having a throat for application to the body to close the cavity except for the throat, the throat being of such cross section with respect to the cavity as to convert the body to a single-throated resonator, an electroacoustic transducer carried by said member and positioned in acoustic communication with said cavity to cause oscillation of the air in the throat and cavity at the natural resonant frequency of said resonator, a variable frequency audio oscillator for electrically energizing the transducer at variable frequencies, a microphone in acoustic communication with the cavity, a phase shift indicator having first and second inputs, said first input coupled to the output of the microphone, and a phase shift network coupling said second input to the oscillator.

21. Apparatus as set forth in claim 20, wherein the phase shift network includes a control for adjustably varying the phase of the input of the oscillator to the indicator.

22. Apparatus as set forth in claim 20, further including a heater in heat-exchange relation to the throat, and means for controlling the heater to maintain the throat at a substantially constant temperature.

23. Apparatus for measuring the volume of a cavity in a body, comprising a member having a throat for application to the body to close the cavity except for the throat, the throat being of such cross section with respect to the cavity as to convert the body to a single-throated resonator, an electroacoustic transducer carried by said member and positioned in acoustic communication with said cavity to cause oscillation of the air in the throat and cavity at the natural resonant frequency of said resonator, a variable frequency audio oscillator for electrically energizing the transducer at variable frequencies, a microphone in acoustic communication with the cavity, a phase shift network and a cathode ray oscillograph tube having one set of deflectors coupled to the output of the microphone and its other set of deflectors coupled to the oscillator through said phase shift network, said network including a control for adjustably varying the phase of the input of the oscillator to the tube.

24. Apparatus as set forth in claim 23, further including a heater in heat-exchange relation to the throat, and means for controlling the heater to maintain the throat at a substantially constant temperature.

25. Apparatus as set forth in claim 23, wherein the throated member comprises relatively movable components adapted to vary the volume of the throat formed thereby.

26. In apparatus of the class described, a housing, an apertured member at one end of the housing adapted to be placed over a cavity in a body, a sleeve telescopically adjustable in the aperture in said member, thereby providing a throat of adjustable length at said end of the housing to convert said body into a single-throated resonator, an electroacoustic transducer mounted in the housing in acoustic communication with the cavity and adapted to cause oscillation of the air in the cavity at its natural resonant frequency, a microphone in acoustic communication with said single-throated resonator for converting said oscillation to an electrical oscillation, and means coupled to the microphone for measuring the frequency of said electrical oscillation as a measure of the volume of the cavity.

27. Apparatus as set forth in claim 26, further including a thin, resilient diaphragm mounted at each end of the throat for sealing it.

28. Apparatus as set forth in claim 26, further including a heater mounted in heat-exchange relation to the throat, and means for controlling the heater to maintain the throat at a substantially constant temperature.

29. In combination, a member having a throat for application to a body having a cavity to convert the body to a single-throated resonator, an electroacoustical transducer in acoustic communication with said cavity and carried by said member, a microphone in acoustic communication with said cavity and carried by said member for converting acoustical oscillation to electrical oscillation, and means coupled to the output of the microphone for measuring the frequency of said electrical oscillation.

30. In combination, a member having a throat for application to a body having a cavity to convert the body to a single-throated resonator, an electroacoustical transducer in acoustic communication with said cavity and carried by said member, a microphone in acoustic communication with said cavity and carried by said member for converting acoustical oscillation to electrical oscillation, an amplifier coupled to the output of the microphone, the output of the amplifier being coupled to the transducer, and means coupled to the output of the amplifier for measuring the frequency of said electrical oscillation.

31. In combination, a member having a throat for application to a body having a cavity to convert the body to a single-throated resonator, an electroacoustical transducer carried by said member in acoustic communication with the cavity through the throat and adapted to cause oscillation of the air within the cavity at its natural resonant frequency, a microphone in acoustic communication with said single-throated resonator for converting said oscillation to an electrical oscillation, and means coupled to the output of the microphone for measuring the frequency of said electrical oscillation as a measure of the volume of the cavity.

32. In combination, a member having a throat for application to a body having a cavity to convert the body to a single-throated resonator, an electroacoustical transducer carried by said member in acoustic communication with the cavity through the throat, a microphone in acoustic communication with said single-throated resonator for converting oscillation of the air within the cavity to an electrical oscillation, means responsive to the output of the microphone for energizing said transducer thereby to cause oscillation of the air within the cavity at its natural resonant frequency, and means coupled to the output of the microphone for measuring the frequency of said electrical oscillation as a measure of the volume of the cavity.

33. In combination, a member having a throat for application to a body having a cavity to convert the body to a single-throated resonator, an electroacoustical transducer carried by said member in acoustic communication with the cavity through the throat and adapted to cause oscillation of the air within the cavity at its natural resonant frequency, a microphone in acoustic communication with said single-throated resonator for converting oscillation of the air within the cavity to an electrical oscillation, means for amplifying the output of the microphone, said amplifying means having a first output coupled to the transducer to energize it and thereby to cause oscillation of the air within the cavity at its natural resonant frequency, and having a second output coupled to means for indicating the frequency of its output.

34. Apparatus as set forth in claim 33 wherein the amplifying means includes means for maintaining the amplitude of oscillation therein substantially constant, thereby to maintain the amplitude of the oscillation of the air in the cavity substantially constant.

FOSTER M. POOLE.
LE ROY C. PASLAY.

References Cited in the file of this patent

UNITED STATES PATENTS

| Number | Name | Date |
| --- | --- | --- |
| 1,570,781 | Ruben | Jan. 26, 1926 |
| 1,834,875 | Schaafhausen | Dec. 1, 1931 |
| 1,867,367 | Marlin | July 12, 1932 |
| 2,270,505 | Burleson | Jan. 20, 1942 |
| 2,277,037 | Clark et al. | Mar. 24, 1942 |
| 2,283,750 | Mikelson | May 19, 1942 |
| 2,285,151 | Firestone | June 2, 1942 |
| 2,403,999 | Read et al. | July 16, 1946 |
| 2,491,418 | Schlesman | Dec. 13, 1949 |

FOREIGN PATENTS

| Number | Country | Date |
| --- | --- | --- |
| 530,176 | France | Sept. 26, 1921 |
| 550,877 | Great Britain | Jan. 28, 1943 |
| 574,819 | Great Britain | Jan. 22, 1946 |